United States Patent
Wang et al.

(10) Patent No.: US 11,620,550 B2
(45) Date of Patent: Apr. 4, 2023

(54) AUTOMATED DATA TABLE DISCOVERY FOR AUTOMATED MACHINE LEARNING

(71) Applicant: International Business Machines Corporation, Armonk, NY (US)

(72) Inventors: Dakuo Wang, Cambridge, MA (US); Mo Yu, White Plains, NY (US); Arunima Chaudhary, Boston, MA (US); Chuang Gan, Cambridge, MA (US); Qian Pan, Canton, MA (US); Daniel Karl I. Weidele, Cambridge, MA (US); Abel Valente, Villa Elisa (AR); Ji Hui Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 16/989,876

(22) Filed: Aug. 10, 2020

(65) Prior Publication Data
US 2022/0044136 A1    Feb. 10, 2022

(51) Int. Cl.
*G06F 3/048*    (2013.01)
*G06N 5/04*    (2023.01)
(Continued)

(52) U.S. Cl.
CPC ........... *G06N 5/04* (2013.01); *G06F 16/2456* (2019.01); *G06N 3/006* (2013.01); *G06N 20/00* (2019.01)

(58) Field of Classification Search
CPC .... G06F 16/2456; G06N 3/006; G06N 20/00; G06N 5/04
See application file for complete search history.

(56) References Cited

U.S. PATENT DOCUMENTS

2017/0364561 A1*  12/2017  Wu ................... G06F 16/2456
2019/0251477 A1*  8/2019  Crosta ............. G06Q 10/06398
(Continued)

FOREIGN PATENT DOCUMENTS

EP              3667512 A1 *  6/2020  .......... G06F 11/3409
WO    WO-2019182590 A1 *  9/2019  ........... G06K 9/6264

OTHER PUBLICATIONS

Anonymous, "Method for related dataset detection, reporting and linking," IP.com, Disclosure No. IPCOM000260581D, 09 Dec. 9, 2019, 2 pages.

(Continued)

*Primary Examiner* — Rashawn N Tillery
(74) *Attorney, Agent, or Firm* — Richard B. Thomas

(57) ABSTRACT

Embodiments relate to a system, program product, and method for leveraging cognitive systems to facilitate the automated data table discovery for automated machine learning, and, more specifically, to leveraging a trained cognitive system to automatically search for additional data in an external data source that may be merged with an initial user-selected data table to generate a more robust machine learning model. Manual efforts to find and validate data appropriate for building and training a particular model for a particular task are significantly reduced. Specifically, a learning-based approach to leverage with machine learning models to automatically discover related datasets and join the datasets for a given initial dataset is disclosed herein. Operations that include dataset selection facilitate continued reinforcement learning of the systems.

20 Claims, 12 Drawing Sheets

(51) Int. Cl.
  *G06N 20/00* (2019.01)
  *G06N 3/006* (2023.01)
  *G06F 16/2455* (2019.01)

(56) References Cited

U.S. PATENT DOCUMENTS

| | | | | |
|---|---|---|---|---|
| 2020/0097491 | A1* | 3/2020 | Berthiaume | G06N 20/00 |
| 2020/0401886 | A1* | 12/2020 | Deng | G06N 3/088 |
| 2021/0064666 | A1* | 3/2021 | Wang | G06F 16/90332 |
| 2021/0279566 | A1* | 9/2021 | Lin | G06K 9/6256 |
| 2021/0390458 | A1* | 12/2021 | Blumstein | G06N 3/08 |
| 2022/0027784 | A1* | 1/2022 | Yuan | G06N 20/00 |
| 2022/0043978 | A1* | 2/2022 | Wang | G06F 40/289 |
| 2022/0076164 | A1* | 3/2022 | Conort | G06N 20/00 |

OTHER PUBLICATIONS

Billman et al., "Automated Discovery in Managerial Problem Formulation: Formation of Causal Hypotheses for Cognitive Mapping," Decision Sciences 24(1), Jun. 2007, pp. 23-41.

Cohen-Shapira et al., "AutoGRD: Model Recommendation Through Graphical Dataset Representation," Proceedings of the 28th ACM International Conference on Information and Knowledge Management, Nov. 3-7, 2019, pp. 821-830.

He et al., "AMC: AutoML for Model Compression and Acceleration on Mobile Devices," Proceedings of the European Conference on Computer Vision (ECCV), Feb. 10, 2018, arXiv:1802.03494v4, pp. 784-800.

Wang et al., "AutoAI: Automating the End-to-End AI Lifecycle with Humans-in-the-Loop," In Proceedings of the 25th International Conference on Intelligent User Interfaces Companion, Mar. 17-20, 2020, pp. 77-78.

Wang et al., "Human-AI Collaboration in Data Science: Exploring Data Scientists' Perceptions of Automated AI," Proceedings of the ACM on Human-Computer Interaction, vol. 3, No. CSCW, Article 211, Nov. 2019, 24 pages.

Xue et al., "Transferable AutoML by Model Sharing Over Grouped Datasets," Proceedings of the IEEE Conference on Computer Vision and Pattern Recognition, Jun. 15-20, 2019, pp. 9002-9011.

Mell et al., "The NIST Definition of Cloud Computing," Recommendations of the National Institute of Standards and Technology, U.S. Department of Commerce, Special Publication 800-145, Sep. 2011, 7 pages.

* cited by examiner

AUTOMATED DATA TABLE DISCOVERY FOR AUTOMATED MACHINE LEARNING

BACKGROUND

The present disclosure relates to cognitive systems and automatic data table discovery for automated machine learning, and, more specifically, to leveraging a trained cognitive system to automatically search for additional data in an external data source that may be merged with an initial user-selected data table to generate a more robust machine learning model.

Many known cognitive systems, including machine learning (ML) and artificial intelligence (AI) platforms, use automated AI (AutoAI) and/or automated ML (AutoML) to automate the end-to-end human intensive tasks that require highly skilled individuals to build AI models and place them into production. The data gathering process for the information that will be used to build an AI model typically requires the respective builders to be fully familiar with the details of the initial datasets, including the quality, quantity, and completeness of the data. In some instances, the lack of one or more of quality, quantity, and completeness of the initial data load may incentivize the model builders to actively research and explore the universe of external datasets to join with the initial dataset to improve the quality of the resultant model.

SUMMARY

A system, computer program product, and method are provided for leveraging a learning-based approach to automatically discover related datasets to join with known datasets to facilitate building machine learning models.

In one aspect, a computer system is provided to leverage a learning-based approach to automatically discover related datasets to join with known datasets to facilitate building machine learning models. The system includes a server including at least one processing device and at least one memory device operably coupled to the at least one processing device. The system also includes a data repository in operable communication with the server. The server is configured to receive a first dataset. The server is also configured to access, automatically, the data repository. The data repository includes a plurality of stored datasets. The server is further configured to determine, automatically, from the plurality of stored datasets, one or more candidate datasets to further generate the one or more machine learning models. The one or more candidate datasets include resident data therein, and at least a portion of the resident data is complementary with the first dataset. In addition, the server is configured to facilitate selection of one or more second datasets from the one or more candidate datasets. Moreover, the server is configured to join at least a portion of the complementary resident data from the one or more second datasets with the first dataset, thereby generating a joined dataset. Furthermore, the server is configured to generate, automatically, through the joined dataset, one or more machine learning models.

In another aspect, a computer program product is provided to leverage a learning-based approach to automatically discover related datasets to join with known datasets to facilitate building machine learning models. The computer program product includes one or more computer readable storage media, and program instructions collectively stored on the one or more computer storage media. The product also includes program instructions to receive a first dataset. The product further includes program instructions to access, automatically, the data repository. The data repository includes a plurality of stored datasets. The product also includes program instructions to determine, automatically, from the plurality of stored datasets, one or more candidate datasets to further generate the one or more machine learning models. The one or more candidate datasets include resident data therein, and at least a portion of the resident data complementary with the first dataset. The product further includes program instructions to facilitate selection of one or more second datasets from the one or more candidate datasets. The product also includes program instructions to join at least a portion of the complementary resident data from the one or more second datasets with the first dataset, thereby generating a joined dataset. The product further includes program instructions program instructions to generate, automatically, through the joined dataset, one or more machine learning models.

In yet another aspect, a computer-implemented method is provided to leverage a learning-based approach to automatically discover related datasets to join with known datasets to facilitate building machine learning models. The method includes receiving a first dataset. The method also includes accessing, automatically, a data repository. The data repository includes a plurality of stored datasets. The method further includes determining, automatically, from the plurality of stored datasets, one or more candidate datasets to further generate the one or more machine learning models. The one or more candidate datasets include resident data therein, and at least a portion of the resident data complementary with the first dataset. The method also includes selecting, from the one or more candidate datasets, one or more second datasets. The method further includes joining at least a portion of the complementary resident data from the one or more second datasets with the first dataset, thereby generating a joined dataset. The method also includes generating, automatically, through the joined dataset, one or more machine learning models.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
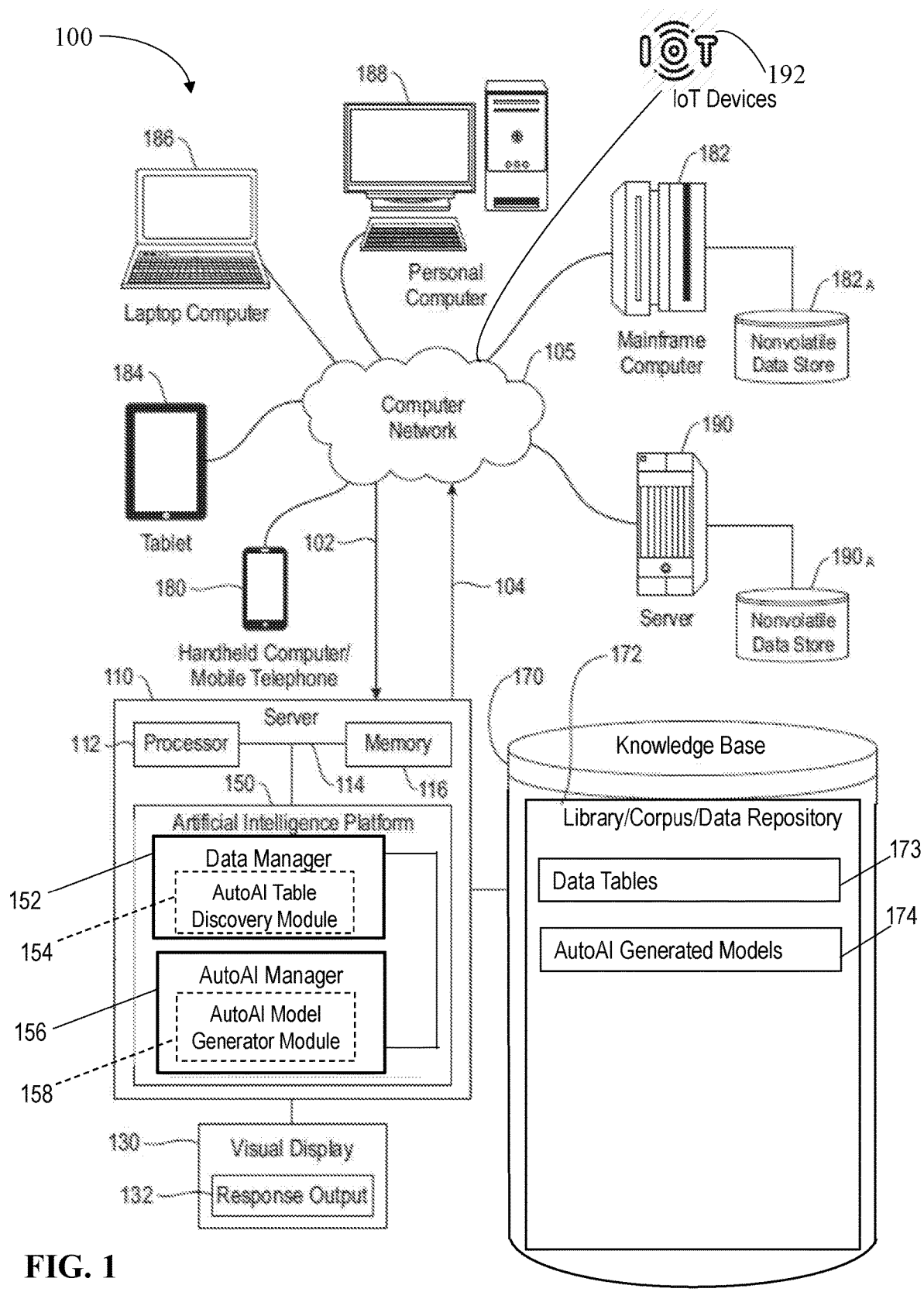
FIG. 1 is a schematic diagram illustrating a computer system including an artificial intelligence platform suitable for leveraging a learning-based approach to automatically discover related datasets to join with known datasets to facilitate building machine learning models, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known cognitive systems, including machine learning (ML) and artificial intelligence (AI) platforms, use automated AI (AutoAI) and/or automated ML (AutoML) to automate the end-to-end human intensive tasks that require highly skilled individuals to build AI models and place them into production. The data gathering process for the information that will be used to build an AI model typically requires the respective builders to be fully familiar with the details of the initial datasets, including the quality, quantity, and completeness of the data. In some instances, the lack of one or more of quality, quantity, and completeness of the initial data load may incentivize the model builders to actively research and explore the universe of external datasets to join with the initial dataset to improve the quality of the resultant model. However, the builders will need to actively explore and try out external datasets to see if the joining of datasets can improve the performance. Such trial and error research is time consuming and expensive.

A system, computer program product, and method are disclosed and described herein for cognitive systems and automatic data table discovery for automated machine learning, and, more specifically, to leveraging a trained cognitive system to automatically search for additional data in an external data source that may be merged with an initial user-selected data table to generate a more robust machine learning model. Many of the embodiments described herein with respect to the system, computer program product, and method significantly reduce the manual efforts to find and validate data appropriate for building and training a particular model for a particular task. Specifically, the embodiments described herein disclose a learning-based approach to leverage with machine learning models to automatically discover related datasets and join the datasets for a given initial dataset. For example, and without limitation, builders may have access to a personalized list of machine learning models on a given dataset, such models generated by the AutoAI/AutoML systems described herein, based on the builders' history of selection/deployment of the respective models. At least some of the embodiments also enable the model builders to interactively select the recommended datasets from the dataset candidates. For example, and without limitation, an artificial intelligence (AI) platform (discussed further herein) is used to facilitate initial data table identification and analysis, and additional data search, analysis, correlation, and collection. The data search is conducted, at least, within a data repository (sometimes referred to as a knowledge library, knowledge base, or knowledge corpus) that is used to store the numerous data tables that may be, or have been, used to build machine learning models. Therefore, this disclosure describes a learning-based and rule-based approach to establish trainable similarity practices to determine degrees of similarity, including a lack thereof, between datasets, i.e., data tables. In addition, the embodiments as described herein are configured to leverage both column distributional information and the cell similarity information to determine appropriate data for the current building of the machine learning model at a cell-level granularity. The operations that include dataset selection facilitate continued reinforcement learning of the systems described herein.

In some embodiments, early in the machine learning model building process, the data to at least initialize the building and training of the model is typically loaded into the model as an initial, or first, dataset. This data has been thoroughly scrutinized by the builders to facilitate populating the model with only relevant data for the model to be built. In many embodiments, the initial dataset is populated with as much known data reasonable readily available to the builders, including known datasets through previous learning as a result of previous model building. Also, in one or more embodiments, the initial dataset is configured in a tabular arrangement with a plurality of first columns and a plurality of first rows. Accordingly, the process described herein includes receiving a first, or initial dataset configured to at least partially generate one or more machine learning models, where the partial generation is due to the initial dataset not being a complete set of data necessary for the proper functioning of the model once placed into production.

In one or more embodiments, a table embedding model includes a convolution neural network to facilitate training of the table embedding model and the auto data table discovery module. The table embedding model is configured to convert the initial dataset to a first, or initial dataset vector. The vector conversion includes analyzing the data structure and content, as well as the metadata, of the initial dataset through the convolution neural network. The data structure, data content, and metadata content are used to train the convolution neural network to recognize those features in the future, or to recognize these features in the present from previous training operations. Accordingly, the convolution neural network within the auto table discovery module facilitates at least some personalization of the model building operations through the data used.

In addition, in some embodiments, the data repository that includes a plurality of stored datasets is automatically accessed through a table embedding model configured within an auto data table discovery module. In at least some embodiments, the auto data table discovery module is configured to automatically determine, from the plurality of stored datasets resident within the data repository, one or more first candidate datasets to further generate the machine learning model under construction. The first candidate datasets include resident data therein, where at least a portion of the resident data may be complementary with the initial dataset. More specifically, the initial dataset vector is transmitted to a ML dataset vector comparison algorithm that is configured to compare the stored dataset vectors representative of each of all of the respective stored datasets, or a designated subset thereof, with the initial dataset vector though a first vector analysis to establish a relevancy of the respective stored datasets.

In at least some embodiments, the features of the stored dataset vectors, including the data structure, data content, and metadata content thereof, are maintained within the convolution neural network that may be trained as to the contents of the data repository. In some embodiments, the convolutional neural network may generate the stored dataset vectors. In some embodiments, a separate vectorization mechanism is used to generate the stored dataset vectors. In some embodiments, the stored dataset vectors are resident within the data repository. In some embodiments, the comparison operations include a first mini-loop of incrementing comparisons with some or all of the stored dataset vectors. In some embodiments, the previous training of the convolutional neural network may be sufficient to "remember" previous vector comparisons and may thereby eliminate at least a portion of the incrementing first mini-loop. In addition, in some embodiments, analyzing historical selections of the stored dataset as a function of the respective previous applications of the stored datasets to the respective machine learning models may also eliminate at least a portion of the incrementing first mini-loop operations.

In one or more embodiments, each comparison of the vectors is scored and measured against a predetermined comparison threshold. In some embodiments, the comparison threshold is established by the builders. In some embodiments, the comparison threshold is established through previous training based on the previous vector comparison scoring. In at least some embodiments, if the comparison scoring exceeds the threshold, the respective stored dataset is identified as a first candidate dataset. In some embodiments, if the comparison scored is at least substantially equal to the threshold, the respective stored dataset is identified as a first candidate dataset. Accordingly, the results of the first vector analysis, i.e., the scores of the first vector comparisons, at least partially determine the first candidate datasets and may exclude other stored datasets from consideration as a function of the relevancy to the initial dataset, with the exception of the operations discussed below.

In one or more embodiments, in addition to analyzing each of the individual stored datasets for relevancy with respect to the initial dataset, the stored datasets are further analyzed to determine relevancy and joinability of the data resident therein. To perform the relevancy and joinability analysis, a second vector analysis is performed. In some embodiments, the second vector analysis is executed in parallel with the first vector analysis on all of the stored datasets, or a designated subset thereof. Specifically, each column of each stored dataset is vectorized in a manner similar to that described for the first vector analysis. Therefore, the vectorization of the stored datasets as previously described includes the vectorization of the respective columns therein. In such embodiments, the vector conversion includes analyzing the data structure and content, as well as the metadata, of the individual columns in the initial dataset through the convolution neural network. The data structure, data content, and metadata content are used to train the convolution neural network to recognize those features in the future, or to recognize these features in the present from previous training operations. Accordingly, a second vector analysis of the data resident within the stored datasets is analyzed in parallel with the stored datasets to determine the relevancy and joinability of the data therein.

The vectors generated for each column of data are generally referred to as second column vectors, in contrast to any vectors representing the first, or initial column, where the term stored column and second column are used interchangeably herein. The respective stored column vectors are compared with the initial dataset vector in the second vector comparison operation. The resulting initial dataset-stored columns vectors' comparison operations include scoring the resultant comparisons with respect to a second threshold. In at least some embodiments, the auto data table discovery module is configured to automatically determine, from the plurality of stored datasets resident within the data repository, one or more second candidate datasets as a function of the one or more stored columns resident within the respective second candidate datasets. In some embodiments, the second candidate datasets overlap with the first candidate datasets. In some embodiments, there is no overlap between the datasets. Specifically, the second vector analysis facilitates a search for columns that may be used to further generate the machine learning model under construction. The stored columns of the second candidate datasets include resident data therein, where at least a portion of the resident data may be complementary with the initial dataset. More specifically, the initial dataset vector as transmitted to the ML dataset vector comparison algorithm is compared to the stored column vectors though the second vector analysis to establish relevancy and joinability of the respective stored data.

In some embodiments, the second comparison operations include a second mini-loop of incrementing comparisons with some or all of the stored column vectors. In some embodiments, the previous training of the convolutional neural network may be sufficient to "remember" previous vector comparisons and may thereby eliminate at least a portion of the incrementing second mini-loop. In addition, in some embodiments, training of the convolutional neural network through analyzing historical selections of the stored dataset as a function of the respective previous applications of the stored datasets to the respective machine learning models may also eliminate at least a portion of the incrementing second mini-loop operations.

In one or more embodiments, in a manner similar to that for the first vector analysis, each initial dataset-stored column vectors' comparison is scored and measured against a predetermined comparison threshold. In some embodiments, the comparison threshold is established by the builders. In some embodiments, the comparison threshold is established through previous training based on the previous initial dataset-second column vectors' comparison scoring. In at least some embodiments, if the comparison scoring exceeds the threshold, the respective stored dataset containing the candidate second column of data is identified as a second candidate dataset. In some embodiments, if the comparison scored is at least substantially equal to the threshold, the respective stored dataset is identified as a second candidate dataset. Therefore, the training of the convolutional neural network with respect to the measure of similarity between datasets may use both column distributional information and the respective cell similarity information to facilitate at least some further personalization of the model building operations through the data used. Accordingly, the results of the second vector analysis, i.e., the scores of the initial dataset-stored column vectors' comparisons, at least partially determine the second candidate datasets and exclude other stored datasets from consideration as a function of the joinability of specific data with the initial dataset.

In at least some embodiments, the builders access a user interface to review the results of the first and second vector comparison operations, including a review of the first and second candidate datasets that appear to be relevant and/or joinable to the initial dataset. At least a portion of the candidate selection process includes an interface between the builders and the auto data table discovery module to determine the best candidates for joining as a function of a weighting of each of the relevancy and joinability determinations. In addition, at least a portion of the candidate selection process includes determining if the data in each of the datasets (initial and candidates) is differentiable or not. As used herein, the term "differentiable" refers to a dataset that may be represented as a continuous function that is differentiable through the full range of the respective domain. This differentiable continuity facilitates training a neural network through forward and backward learning, and facilitates fully automated and optimized post-training analysis of differentiable data/problems within the respective domain. Typically, supervised learning operations are used to input the differentiable data into the respective neural network. in contrast, non-differentiable data due to discontinuities, i.e., gaps in the data used to train the neural network may require reinforcement learning operations to overcome the gaps.

The candidate selection process further includes aspects of exercising aspects of "cooperative gaming solutions" to determine the best candidate datasets that include at least some additional data that may be used to complement the initial dataset. As used herein, developing a cooperative game solution includes determining, through a specialized algorithm resident within the auto data table joining algorithm, from the set of candidate datasets, which datasets provide both the best aspects of relevancy and joinability, where the two characteristics may include opposing features therebetween. For example, and without limitation, while the first vector analysis may indicate a degree of relevancy between a particular stored dataset and the initial dataset that exceeds the established threshold, due to a degree of non-differentiable data, i.e., gaps in the respective data established in the second vector analysis, the respective individual cells of data may not reach the relevancy and joinability threshold. In contrast, while there may be a good degree of relevant and joinable data within the cells of the candidate dataset, the overall relevancy of the respective dataset may not reach the respective relevancy threshold. Therefore, the auto data table joining algorithm embedded in the auto data table discovery module will automatically determine the tradeoffs between the identified datasets to select the dataset that best complements the data in the initial dataset, and select those candidate datasets that will best provide the desired results in the model under construction. Such selections are recorded within the auto data table discovery module for additional training of the module for future stored dataset selection operations. Accordingly, the auto data table discovery module determines the best tradeoff solutions for balancing the needs of the user with the data that is available.

In at least some embodiments, under the parameters previously discussed, the one or more candidate datasets are considered by the builders and one or more second datasets are selected therefrom. As previously described, the first vector analysis determines those relevant stored first candidate datasets and the second vector analysis determines those columns of the stored second candidate datasets with relevant and joinable data. The respective candidate datasets are presented to the builders through the user interface. The candidate datasets with relevant and joinable columns are indicated through the user interface. In addition, those candidate datasets without relevant and joinable columns are also indicated as having no respective columns. A first portion of the columns in the candidate datasets may overlap with a portion of the columns in the initial dataset. Also, a second portion of the columns in the candidate datasets will be determined by the auto data table joining algorithm to be neither relevant nor joinable and will be ignored. Further, a third portion of the columns in the candidate datasets may be both relevant and joinable. Accordingly, once one or more candidate datasets are selected by the builders through the user interface, the model creation is initiated.

The auto data table joining algorithm records the builder selections for training the table embedding model and joins at least a portion of the complementary resident data from the one or more second datasets selected from the candidate datasets with the data in the initial dataset, thereby generating a joined dataset. As discussed previously, the selected columns to be joined are selected by the auto data table joining algorithm. The joined dataset is transmitted to a trainable autoAI manager that uses an auto AI model generator module to build the one or more machine learning models. Notably, the described process is agnostic toward the subject matter of the datasets. The trainable autoAI manager also includes machine learning features that are trained through the selection of the data in the joined dataset used to build the respective models to improve future model building operations.

Artificial Intelligence (AI) is one example of cognitive systems that relate to the field of computer science directed at computers and computer behavior as related to humans. Cognitive computing utilizes self-teaching algorithms that use, for example, and without limitation, data analysis, visual recognition, behavioral monitoring, and natural language processing (NLP) to solve problems and optimize human processes. The data analysis and behavioral monitoring features analyze the collected relevant data and behaviors as subject matter data as received from the sources as discussed herein. As the subject matter data is received, organized, and stored, the data analysis and behavioral monitoring features analyze the data and behaviors to determine the relevant details through computational analytical tools which allow the associated systems to learn, analyze, and understand human behavior, including within the context of the present disclosure. With such an understanding, the AI can surface concepts and categories, and apply the acquired knowledge to teach the AI platform the relevant portions of the received data and behaviors.

In addition, cognitive systems such as AI, based on information, are able to make decisions, which maximizes the chance of success in a given topic. More specifically, AI is able to learn from a dataset, including behavioral data, to solve problems and provide relevant recommendations. For example, in the field of artificial intelligent computer systems, machine learning (ML) systems process large volumes of data, seemingly related or unrelated, where the ML systems may be trained with data derived from a database or corpus of knowledge, as well as recorded behavioral data. The ML systems look for, and determine, patterns, or lack thereof, in the data, "learn" from the patterns in the data, and ultimately accomplish tasks without being given specific instructions. In addition, the ML systems, utilizes algorithms, represented as machine processable models, to learn from the data and create foresights based on this data. More specifically, ML is the application of AI, such as, and without limitation, through creation of neural networks that can demonstrate learning behavior by performing tasks that are not explicitly programmed. Deep learning is a type of neural-network ML in which systems can accomplish complex tasks by using multiple layers of choices based on output of a previous layer, creating increasingly smarter and more abstract conclusions.

ML learning systems may have different "learning styles." One such learning style is supervised learning, where the data is labeled to train the ML system through telling the ML system what the key characteristics of a thing are with respect to its features, and what that thing actually is. If the thing is an object or a condition, the training process is called classification. Supervised learning includes determining a difference between generated predictions of the classification labels and the actual labels, and then minimize that difference. If the thing is a number, the training process is called regression. Accordingly, supervised learning specializes in predicting the future.

A second learning style is unsupervised learning, where commonalities and patterns in the input data are determined by the ML system through little to no assistance by humans. Most unsupervised learning focuses on clustering, i.e., grouping the data by some set of characteristics or features. These may be the same features used in supervised learning, although unsupervised learning typically does not use labeled data. Accordingly, unsupervised learning may be used to find outliers and anomalies in a dataset, and cluster the data into several categories based on the discovered features.

Semi-supervised learning is a hybrid of supervised and unsupervised learning that includes using labeled as well as unlabeled data to perform certain learning tasks. Semi-supervised learning permits harnessing the large amounts of unlabeled data available in many use cases in combination with typically smaller sets of labelled data. Semi-supervised classification methods are particularly relevant to scenarios where labelled data is scarce. In those cases, it may be difficult to construct a reliable classifier through either supervised or unsupervised training. This situation occurs in application domains where labelled data is expensive or difficult obtain, like computer-aided diagnosis, drug discovery and part-of-speech tagging. If sufficient unlabeled data is available and under certain assumptions about the distribution of the data, the unlabeled data can help in the construction of a better classifier through classifying unlabeled data as accurately as possible based on the documents that are already labeled.

The third learning style is reinforcement learning, where positive behavior is "rewarded: and negative behavior is "punished." Reinforcement learning uses an "agent," the agent's environment, a way for the agent to interact with the environment, and a way for the agent to receive feedback with respect to its actions within the environment. An agent may be anything that can perceive its environment through sensors and act upon that environment through actuators. Therefore, reinforcement learning rewards or punishes the ML system agent to teach the ML system how to most appropriately respond to certain stimuli or environments. Accordingly, over time, this behavior reinforcement facilitates determining the optimal behavior for a particular environment or situation.

Deep learning is a method of machine learning that incorporates neural networks in successive layers to learn from data in an iterative manner. Neural networks are models of the way the nervous system operates. Basic units are referred to as neurons, which are typically organized into layers. The neural network works by simulating a large number of interconnected processing devices that resemble abstract versions of neurons. There are typically three parts in a neural network, including an input layer, with units representing input fields, one or more hidden layers, and an output layer, with a unit or units representing target field(s). The units are connected with varying connection strengths or weights. Input data are presented to the first layer, and values are propagated from each neuron to every neuron in the next layer. At a basic level, each layer of the neural network includes one or more operators or functions operatively coupled to output and input. Output from the operator(s) or function(s) of the last hidden layer is referred to herein as activations. Eventually, a result is delivered from the output layers. Deep learning complex neural networks are designed to emulate how the human brain works, so computers can be trained to support poorly defined abstractions and problems. Therefore, deep learning is used to predict an output given a set of inputs, and either supervised learning or unsupervised learning can be used to facilitate such results.

Referring to FIG. 1, a schematic diagram is provided illustrating a computer system 100, that in the embodiments described herein, is an automated machine learning (ML) system 100 that is configured to train one or more models to facilitate automatic data table discovery for automated machine learning, and, more specifically, to leveraging a trained cognitive system to automatically search for additional data in an external data source that may be merged with an initial user-selected data table to generate a more robust machine learning model. In at least one embodiment, the automated ML system 100 is embodied as a cognitive system, i.e., an artificial intelligence (AI) platform computing system that includes an artificial intelligence platform 150 suitable for establishing automatic data table discovery for automated machine learning.

As shown, a server 110 is provided in communication with a plurality of computing devices 180, 182, 184, 186, 188, 190, and 192 across a computer network connection 105. The computer network connection 105 may include several information handling devices. Types of information handling devices that can utilize the automated ML 100 range from small handheld devices, such as a handheld computer/mobile telephone 180 to large mainframe systems, such as a mainframe computer 182. Examples of information handling systems includes, personal digital assistants (PDAs), personal entertainment devices, pen or tablet computer 184, laptop or notebook computer 186, personal computer system 188, server 190, and one or more Internet of Things (IoT) devices 192, that in at least some embodiments, include connected cameras. As shown, the various information handling systems can be networked together using the computer network connection 105.

Various types of a computer networks can be used to interconnect the various information handling systems, including Local Area Networks (LANs), Wireless Local Area Networks (WLANs), the Internet, the Public Switched Telephone Network (PSTN), other wireless networks, and any other network topology that can be used to interconnect information handling systems and computing devices as described herein. Many of the information handling systems include non-volatile data stores, such as hard drives and/or non-volatile memory. Some of the information handling systems may use separate non-volatile data stores, e.g., server 190 utilizes non-volatile data store 190a, and mainframe computer 182 utilizes non-volatile data store 182a. The non-volatile data store 182a can be a component that is external to the various information handling systems or can be internal to one of the information handling systems.

The server 110 is configured with a processing device 112 in communication with memory 116 across a bus 114. The server 110 is shown with the artificial intelligence (AI) platform 150 for cognitive computing, including machine learning, over the computer network connection 105 from one or more of the computing devices 180, 182, 184, 186, 188, 190, and 192. More specifically, the computing devices 180, 182, 184, 186, 188, 190, and 192 communicate with each other and with other devices or components via one or more wired and/or wireless data communication links, where each communication link may comprise one or more of wires, routers, switches, transmitters, receivers, or the like. In this networked arrangement, the server 110 and the computer network connection 105 enable communication, detection, recognition, and resolution. The server 110 is in operable communication with the computer network through communications links 102 and 104. Links 102 and 104 may be wired or wireless. Other embodiments of the server 110 may be used with components, systems, subsystems, and/or devices other than those that are depicted herein.

The AI platform 150 is shown herein configured with tools to enable one or more of learning techniques to execute automatic data table discovery for automated machine learning. More specifically, the AI platform 150 is configured for leveraging a trained cognitive system to automatically search for additional data in an external data source that may be merged with an initial user-selected data table to generate a more robust machine learning model. Moreover, many of the embodiments of the AI platform 150 described herein are configured to significantly reduce the manual efforts to find and validate data appropriate for building and training a particular model for a particular task. Specifically, the embodiments described herein disclose a learning-based approach to leverage with machine learning models to automatically discover related datasets and join the datasets for a given initial dataset. Accordingly, the AI platform 150 includes a learning-based mechanism that can facilitate initial data table identification and analysis, and additional data search, analysis, correlation, and collection through a learning-based and rule-based approach to establish trainable similarity practices to determine degrees of similarity, including a lack thereof, between datasets, i.e., data tables.

The tools shown herein include, but are not limited to, a data manager 152 including an autoAI table discovery module 154 embedded therein, and an autoAI manager 156 including an autoAI generator module 158 embedded therein, where the data manager 152 and the auto AI manager 156 include the machine learning (ML) features. The data manager 152 and the auto AI manager 156 are described further herein with respect to FIGS. 2-8.

The AI platform 150 may receive input from the computer network connection 105 and leverage a knowledge base 170, also referred to herein as a data source, to selectively access training and other data. The knowledge base 170 is provided operably coupled to the server 110 including the processing device 112 and/or memory 116. In at least one embodiment, the knowledge base 170 may be directly operably coupled to the server 110. In some embodiments, the knowledge base 170 is communicatively coupled to the server 110 across the computer network connection 105. In at least one embodiment, the knowledge base 170 includes a data repository 172, sometimes referred to as a data library 172, or knowledge corpus 172, that may be in the form of one or more databases. The data repository 172 includes different databases, including, but not limited to, a data tables database 173 and an autoAI generated models database 174, where the databases 173-174 are described further herein. Accordingly, the server 110 including the AI platform 150, data manager 152 and the autoAI manager 156 receive information from the computer network connection 105 and the devices connected thereto, and the knowledge base 170.

In at least some embodiments, the data tables database 173 includes the full inventory of available data tables i.e., datasets, available to execute the operations as described herein directed towards finding and joining datasets by the data manager 152. In one or more embodiments, the data tables include a variety of subject matters, where the automated ML system 100 is agnostic to the subject matter of the data tables. Also, in at least some embodiments, the data tables database 173 includes the joined tables as generated through the data manager 152 as well as any metadata reflective of the data tables, including portions thereof, that were merged. Similarly, the autoAI generated models database 174 includes the models generated by the autoAI manager 156 as described further herein. Accordingly, the datasets and the models generated therefrom are collected, generated, and managed within their respective databases 173 and 174 by the data manager 152 and the autoAI manager 156, respectively.

A response output 132 includes, for example, and without limitation, output generated in response to a query of the data repository 172 that may include some combination of the datasets resident therein. Further details of the information displayed is described with respect to FIGS. 3-8.

In at least one embodiment, the response output 132 is communicated to a corresponding network device, shown herein as a visual display 130, operatively coupled to the server 110 or in at least one other embodiment, operatively coupled to one or more of the computing devices 180-192 across the computer network connection 105.

The computer network connection 105 may include local network connections and remote connections in various embodiments, such that the artificial intelligence platform 150 may operate in environments of any size, including local and global, e.g., the Internet. Additionally, the AI platform 150 serves as a front-end system that can make available a variety of knowledge extracted from or represented in network accessible sources and/or structured data sources. In this manner, some processes populate the AI platform 150, with the AI platform 150 also including one or more input interfaces or portals to receive requests and respond accordingly.

Figure 2:
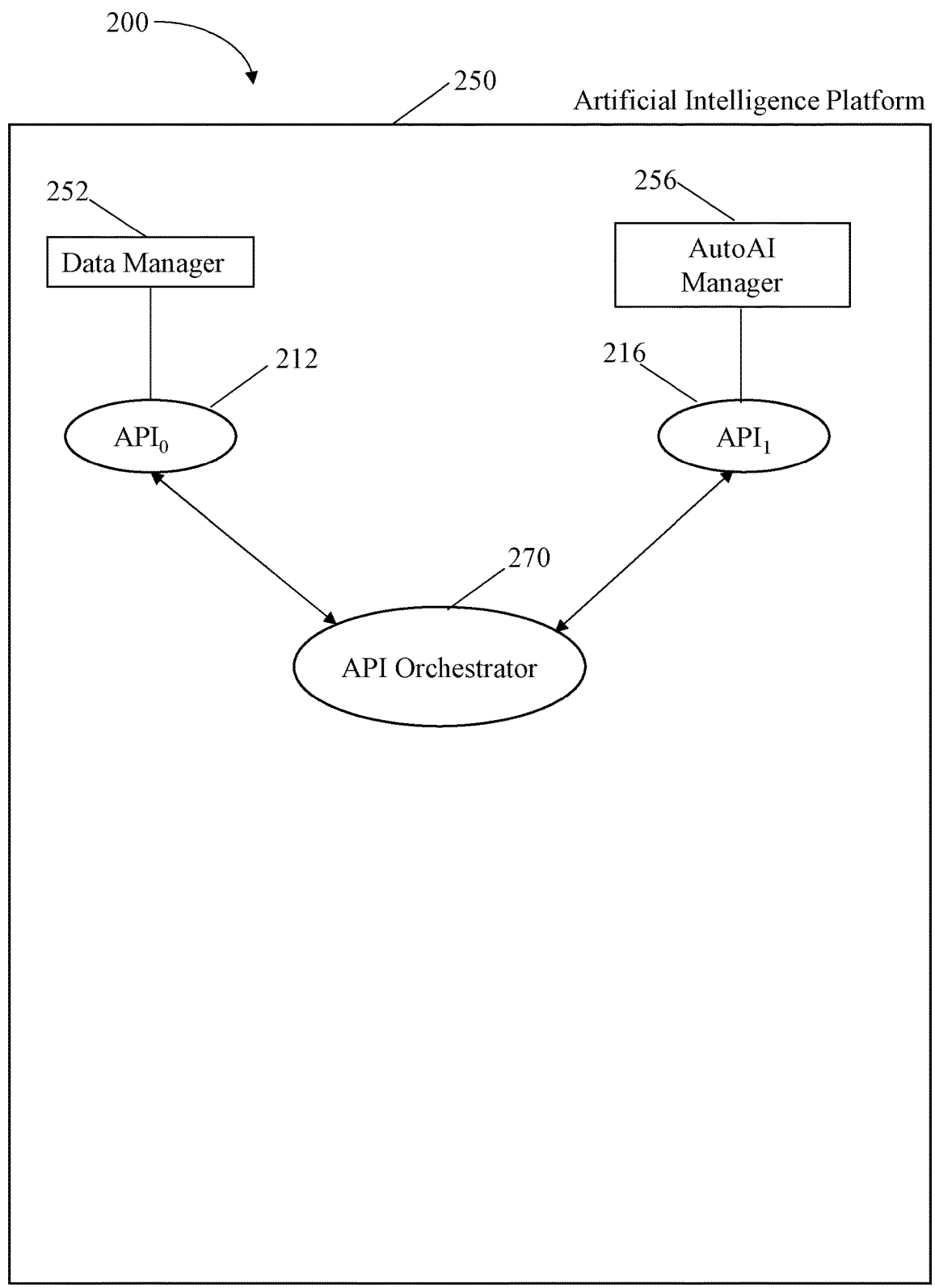
FIG. 2 is a block diagram illustrating artificial intelligence platform tools, as shown and described in FIG. 1, and their associated application program interfaces, in accordance with some embodiments of the present disclosure.

An Application Program Interface (API) is understood in the art as a software intermediary, e.g., invocation protocol, between two or more applications which may run on one or more computing environments. With respect to the AI platform 150 shown and described in FIG. 1, one or more APIs may be utilized to support one or more of the tools 152 and 156 and their associated functionality. Referring to FIG. 2, a block diagram 200 is provided illustrating the tools 252 and 256 and their associated APIs. As shown, a plurality of tools is embedded within the AI platform 250, that is equivalent to the AI platform 150 (shown in FIG. 1). The AI platform 250 includes the tools including, but not limited to, the data manager 152 (shown herein as 252) associated with $API_0$ 212, and the autoAI manager 156 (shown herein as 256) associated with $API_1$ 216.

Each of the APIs may be implemented in one or more languages and interface specifications. $API_0$ 212 provides functional support for, without limitation, the data manager 252 that is configured to facilitate execution of one or more operations by the server 110. Such operations include, without limitation, collecting, storing, and recalling the data stored within the database 173 as discussed herein, and providing data management and transmission features not provided by the other manager 256. Accordingly, the data manager 252 is configured to facilitate building, storing, and managing the data repository 172 including, without limitation, joining of the data resident therein.

In at least some embodiments, the autoAI table discovery module 154 may be considered a first agent, and the functionality thereof is implemented through the $API_0$ 212. In addition, and more specifically, in some embodiments the $API_0$ 212 provides functional support for, without limitation, receiving an initial dataset, converting the initial dataset and each stored dataset to dataset vectors, and vectorizing each column of each stored dataset. The $API_0$ 212 provides functional support for, without limitation, automatically accessing the plurality of stored datasets within the data repository and executing the first and second vector analyses. Moreover, the $API_0$ 212 provides functional support for, without limitation, determining stored datasets and their columns for joining with the initial dataset, and presenting the candidate datasets to the builders through a user interface.

The $API_1$ 256 provides functional support for, without limitation, the autoAI manager 256 to facilitate execution of one or more operations by the server 110. In at least some embodiments, the autoAI model generator module 158 may be considered a second agent, and the functionality thereof is implemented through the $API_1$ 216. In some embodiments, such operations include, without limitation, joining at least a portion of the complementary resident data, including selected columns, from the one or more stored datasets with the initial dataset, thereby generating a joined dataset, and automatically generating one or more machine learning models.

As shown, each of the APIs 212 and 216 are operatively coupled to an API orchestrator 270, otherwise known as an orchestration layer, which is understood in the art to function as an abstraction layer to transparently thread together the separate APIs. In at least one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
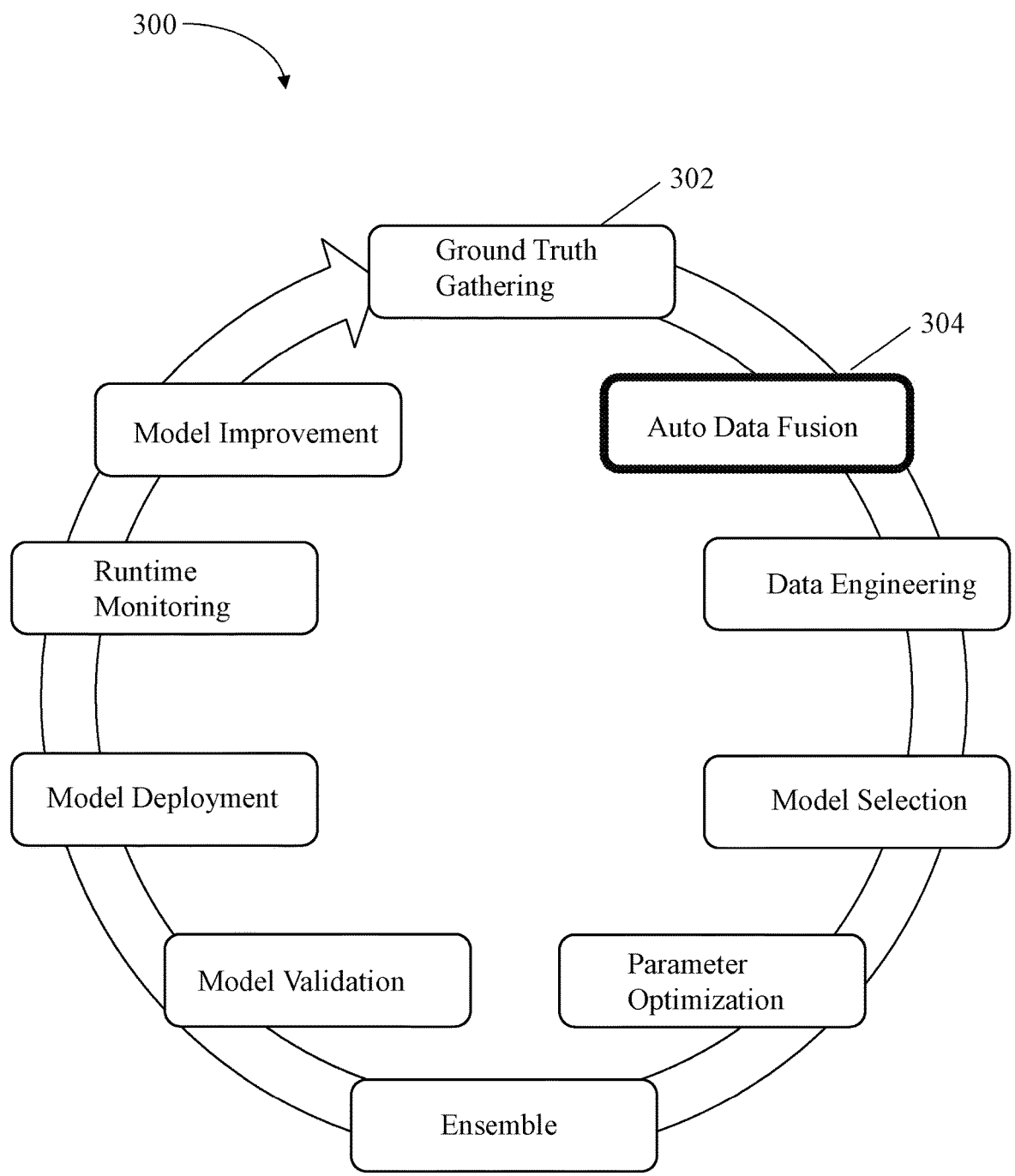
FIG. 3 is a high-level flowchart of a process for building and deploying an AI platform, in accordance with some embodiments of the present disclosure.

Referring to FIG. 3, a high-level flowchart is provided illustrating a process 300 for building and deploying an AI platform, such as the AI platform 150, i.e., machine learning model building process 300. The process 300 starts with ground truth gathering 302 where the initial dataset to be used to generate the machine learning models as described herein is gathered, evaluated, and approved. The initial dataset is discussed further herein. The process 300 also includes an automated data fusion 304 operation that uses the initial dataset and reaches out to the data repository 172 for finding and joining additional data automatically, with some user interaction for the final selection of the data to be fused with the initial dataset. The automatic data fusion 304 operation is shown in bold in FIG. 3 and is the principle subject of the present disclosure. The remaining operations are not discussed further herein, other than that each of the operations in the process 300 subsequent to the automatic data fusion 304 operation may provide additional opportunities to further train the AI platform 150 to improve subsequent automatic data fusion 304 operation.

Figure 4:
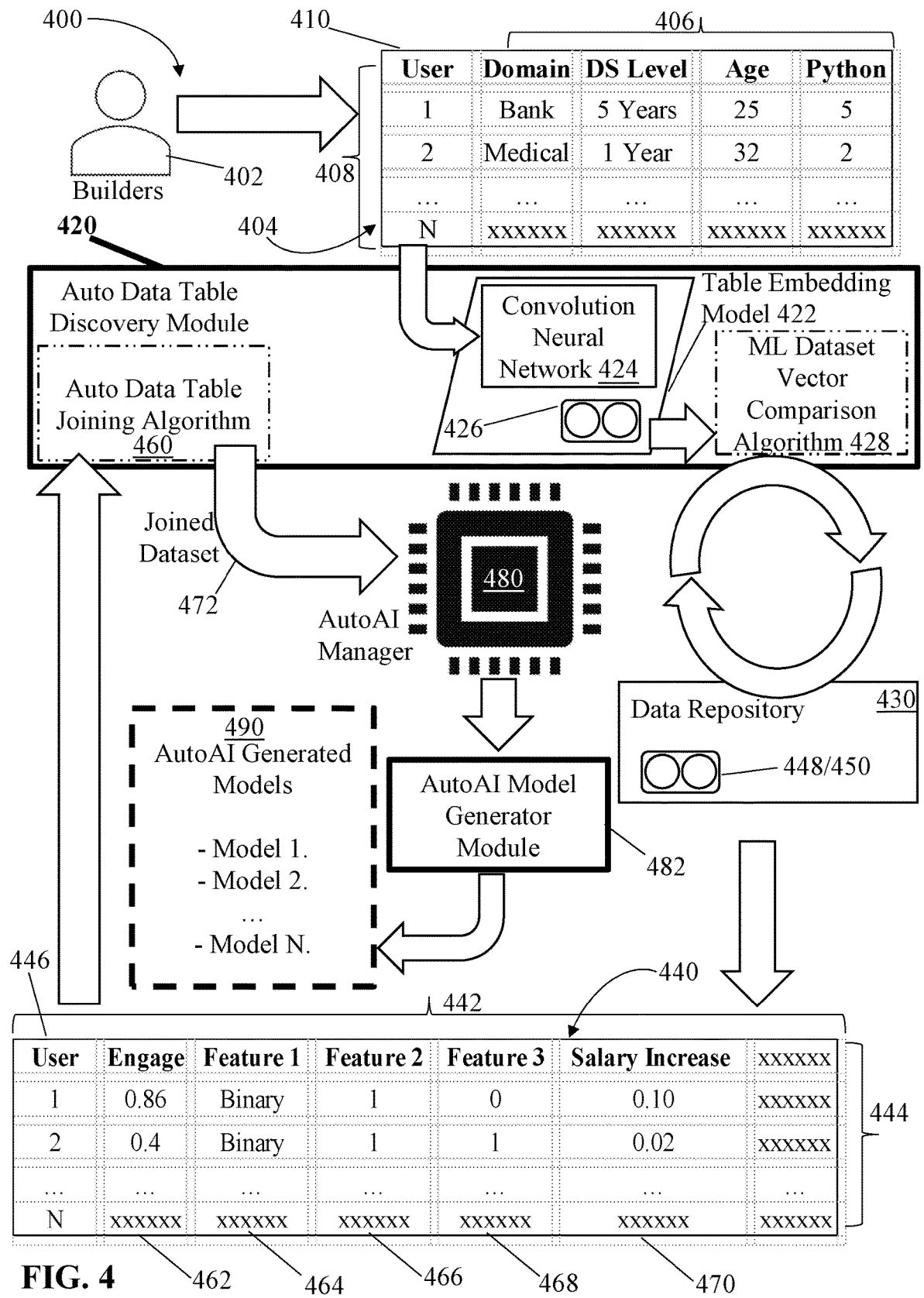
FIG. 4 is a flowchart of a process for leveraging a learning-based approach to automatically discover related datasets to join with known datasets to facilitate building machine learning models, in accordance with some embodiments of the present disclosure.
Figure 5:
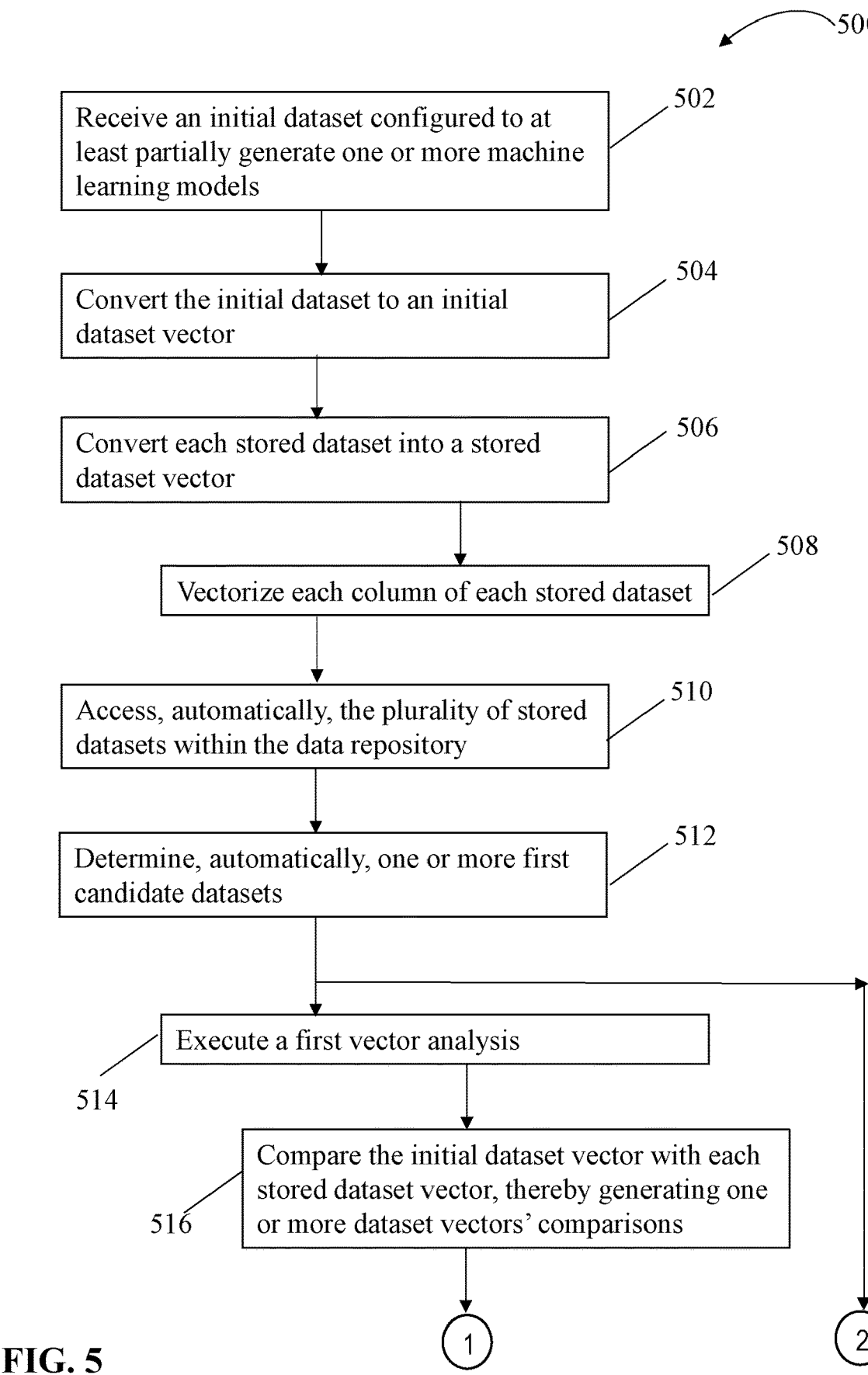
FIG. 5 is a flowchart of a process for automatic discovery of related datasets to join with known datasets to facilitate building machine learning models, in accordance with some embodiments of the present disclosure.
Figure 5:
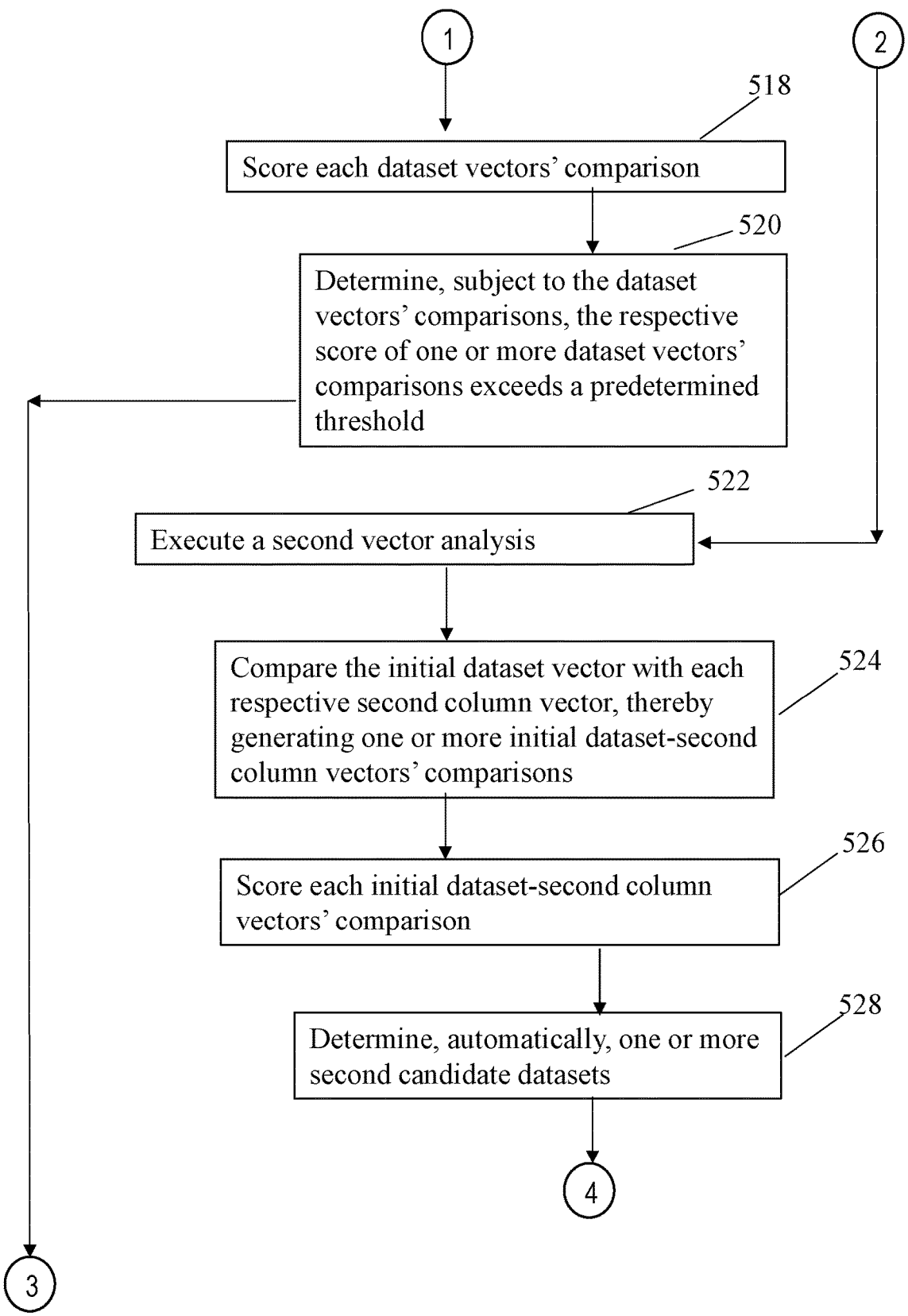
Figure 5:
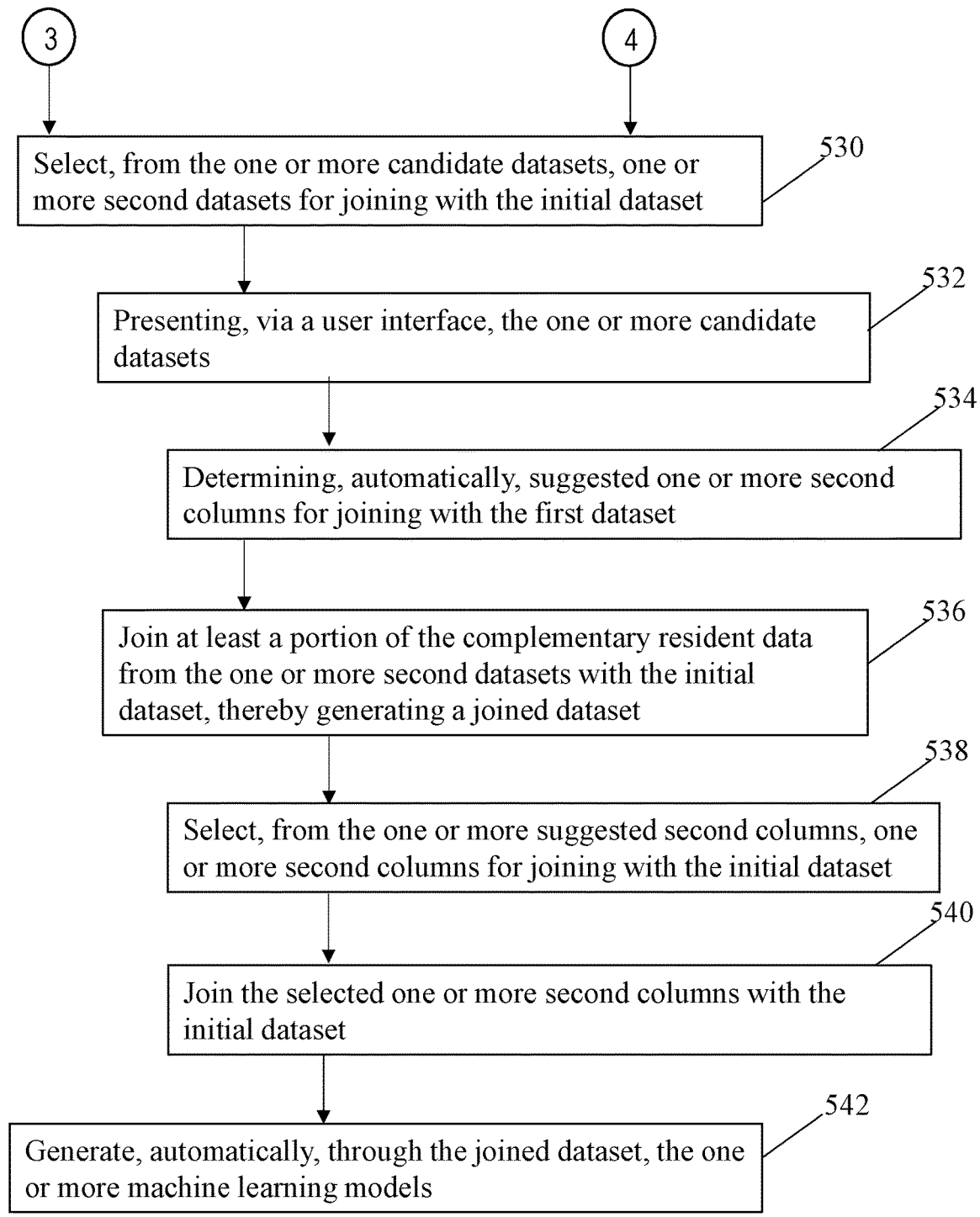

Referring to FIG. 4, a flowchart is provided illustrating a process 400 for leveraging a learning-based approach to automatically discover related datasets to join with known datasets to facilitate building machine learning models. In addition, referring to FIG. 5, a flowchart is provided illustrating a process for automatic discovery of related datasets to join with known datasets to facilitate building machine learning models. FIGS. 4 and 5 are discussed together, with reference to FIGS. 1-3.

In at least some embodiments, early in the machine learning model building process 300, i.e., at the ground truth gathering 302 operation, the data to at least initialize the building and training of the model is typically loaded into the model as an initial, or first, dataset 404. Specifically, the builders 402 research and build a builder input table, i.e., the initial dataset 404. This data within the initial dataset 404 has been thoroughly scrutinized by the builders 402 to facilitate populating the pending machine learning model with data that is substantially limited to relevant data for the model to be built. In many embodiments, the initial dataset 404 is populated with as much known data reasonable readily available to the builders 402, including known datasets through previous learning as a result of previous model building operations. Also, in one or more embodiments, the initial dataset 404 is configured in a tabular arrangement with a plurality of first columns 406 and a plurality of first rows 408 defining a plurality of first data cells to hold first data therein (the first data cells and first data are not numbered). One such column 406 is the first column 410 that will be discussed further herein. As described with respect to FIG. 1, the data manager 152 embedded within the AI platform 150 includes the autoAI table discovery module 154, referred to as the autoAI table discovery module 420 with respect to FIG. 4. The autoAI table discovery module 420 is discussed further herein. The initial dataset 404 is transmitted to the autoAI table discovery module 420. Accordingly, the process 400 includes receiving 502 the initial dataset 404 that is configured to at least partially generate one or more machine learning models, where the partial generation is due to the initial dataset 404 being recognized by the builders 402 as possibly not being a complete set of data necessary for the proper functioning of the model once placed into production.

In one or more embodiments, the autoAI table discovery module 420 includes a table embedding model 422, that in turn, includes an embedded convolution neural network 424. The convolution neural network 424 is configured to facilitate training of the table embedding model 422, and hence training the auto data table discovery module 420. The table embedding model 422 is configured to receive 502 the initial dataset 404 and convert 504 the initial dataset 404 to a first, or initial dataset vector 426. The vector conversion 504 operation includes analyzing the data structure and content, as well as the metadata, of the initial dataset 404 through the convolution neural network 424. The data structure, data content, and metadata content are used to train the convolution neural network 424 to recognize those features in future machine learning model building operations, or to recognize these features in the present machine learning model building process 300 from previous training operations. Therefore, the convolution neural network 424 embedded within the auto table discovery module 420 facilitates at least some personalization of the model building operations through thoroughly analyzing the data used by the builders 402 in parallel with the initial dataset conversion 504 operations. Accordingly, the auto data table discovery module 420 embedded within the data manager 152 trains itself on the initial dataset 404 through a deep analysis of the data embedded therein.

In addition, in some embodiments, as previously discussed, the data repository 172 (referred to as the data repository 430 with reference to FIG. 4) includes a plurality of stored datasets within the data tables database 173. An example of one stored dataset 440 is illustrated in FIG. 4. In many embodiments, the stored dataset 440 is populated with data that may, or may not, include data relevant to the initial dataset 404. Also, in one or more embodiments, the stored dataset 440 is configured in a tabular arrangement with a plurality of stored, or second columns 442 and a plurality of stored, or second rows 444 defining a plurality of second data cells to hold second data therein (the second data cells and second data are not numbered). The data within one such second column 446 overlaps the data in the first column 410.

In at least one embodiment, the process 400 further includes converting 506 each stored dataset, e.g., stored dataset 440, into a stored dataset vector 448 (only one shown). In at least some embodiments, the features of the stored dataset vectors 448, including the data structure, data content, and metadata content thereof, are maintained within the convolution neural network 424 that may be trained as to the contents of the data repository 430. In some embodiments, the convolutional neural network 424 may generate the stored dataset vectors 448. In some embodiments, a separate vectorization mechanism is used to generate the stored dataset vectors 448. In some embodiments, the stored dataset vectors 448 are resident within the data repository 430 (as shown in FIG. 4). Accordingly, in a manner similar to the vector conversion operation 504 for the initial dataset 404, the stored datasets 440 undergo a vector conversion operation 506.

Moreover, in at least some embodiments, each column 442 of each stored dataset 440 is vectorized 508. The vectorization operation 508 of the second columns 442 may be executed in parallel with the vector conversion operation 506. Therefore, in some embodiments, the vectorization operations 506 and 508 of the stored datasets 440 includes analyzing the data structure and content, as well as the metadata, of the individual columns 406 in the initial dataset 404 and the individual columns 442 of the stored datasets 440 through the convolution neural network 424. The data structure, data content, and metadata content of both the initial dataset 404 and the stored datasets 440 are used to train the convolution neural network 424 to recognize those features in future machine learning model building operations, or to recognize these features in the present machine learning model building process 300 from previous training operations. The vectors generated for each column 442 of the stored datasets 440 are generally referred to as second column vectors 450, in contrast to any vectors (not shown) representing the first, or initial columns 406, where the term stored column 450 and second column 450 are used interchangeably herein. For clarity, the second column vectors 450 are shown embedded with the stored dataset vectors 448.

In addition, in some embodiments, the data repository 430 is automatically accessed 510 through the table embedding model 422 resident within the auto data table discovery module 420. In at least some embodiments, the auto data table discovery module 420 is configured to automatically determine 512, from the plurality of stored datasets 440 resident within the data repository 430, one or more first candidate datasets to further generate the machine learning model presently under construction. One possible first candidate dataset is the stored dataset 440. The first candidate datasets include resident data therein, where at least a portion of the resident data may be complementary with the first data resident within initial dataset 404. More specifically, the initial dataset vector 426 is transmitted to a ML dataset vector comparison algorithm 428 that is resident within the auto data table discovery module 420. The ML dataset vector comparison algorithm 428 is configured to compare (discussed further) the stored dataset vectors 448 representative of the respective stored datasets 440, or a designated subset thereof, with the initial dataset vector 426 though a first vector analysis to establish a relevancy of the respective stored datasets, and joinability with the initial dataset 404. Accordingly, the auto data table discovery module 420 executes 514 the first vector analysis to perform discovery of candidate datasets for joining with the initial dataset 404.

One illustrative example of complementary data includes one embodiment including a business, such as a supermarket, that is attempting to forecast on the $29^{th}$ day of a 31-day month prospective sales for the last two days of the month. The business has the first 29 days of data. The business also has historical data for previous years. A number of varying data sources will need to be queried for such a forecast. For example, and without limitation, are any of the next two days holidays or are there any special events in the vicinity planned? Is there construction nearby that may deter potential, or well-established, customers? What are the forecasted weather conditions? To gather this data, the business will need to locate the respective datasets in one or more external data repositories. Such additional data will complement the existing data for establishing a better forecast than without such data. Accordingly, complementary data is that data that is necessary to provide better training to the respective machine learning model to generate better responses to inquiries.

In some embodiments, the initial dataset vector 426 is compared 516 with each stored dataset vector 450, thereby generating one or more dataset vectors' comparisons. In some embodiments, the comparison operations 516 include a first mini-loop of incrementing comparisons with some or all of the stored dataset vectors 448. In some embodiments, the previous training of the convolutional neural network 424 may be sufficient to "remember" previous vector comparisons and may thereby eliminate at least a portion of the incrementing first mini-loop. In addition, in some embodiments, training of the convolutional neural network 424 through analyzing historical selections of the stored datasets 440 as a function of the respective previous applications of the stored datasets 440 to the respective machine learning models may also eliminate at least a portion of the incrementing first mini-loop operations.

In one or more embodiments, each comparison 516 of the stored dataset vectors 448 with the initial dataset vectors 426 is scored 518 and measured against a predetermined first comparison threshold 520. In some embodiments, the comparison threshold is established by the builders 402. In some embodiments, the comparison threshold is established through previous training based on the previous vector comparison scoring. In at least some embodiments, if the comparison scoring exceeds the threshold, the respective stored dataset 440 is identified as a first candidate dataset. In some embodiments, if the comparison scored is at least substantially equal to the threshold, the respective stored dataset 440 is identified as a first candidate dataset. Accordingly, the results of the first vector analysis operation 514, i.e., the scores of the first vector comparison operations 516, at least partially determine the first candidate datasets and may exclude other stored datasets from consideration as a function of the relevancy to the initial dataset 404, with the exception of the operations discussed below.

In one or more embodiments, in addition to analyzing each of the individual stored datasets 440 for relevancy with respect to the initial dataset 404, the stored datasets 440 are further analyzed to determine relevancy and joinability of the data resident therein. To perform the relevancy and joinability analysis, a second vector analysis is executed 522. In some embodiments, the second vector analysis is executed 522 in parallel with the first vector analysis execution 514 on all of the stored datasets 440, or a designated subset thereof. Accordingly, a second vector analysis of the data resident within the stored datasets is executed 522 in parallel with the stored datasets 440 to determine the relevancy and joinability of the data therein.

In embodiments, the respective stored column vectors 450 are compared 524 with the initial dataset vector 426 in the second vector comparison analysis operation 522. The resulting initial dataset-stored columns vectors' comparison operations 524 include scoring 526 the resultant comparisons with respect to a second threshold. In at least some embodiments, the auto data table discovery module 420 is configured to automatically determine 528, from the plurality of stored datasets 440 resident within the data repository 430, one or more second candidate datasets as a function of the one or more stored columns 442 resident within the respective second candidate datasets 440. In some embodiments, the second candidate datasets resulting from the second vector analysis 522 overlap with the first candidate datasets resulting from the first vector analysis 514. In some embodiments, there is no overlap between the datasets. Specifically, the second vector analysis facilitates a search for columns that may be used to further generate the machine learning model under construction. The stored columns of the second candidate datasets include resident data therein, where at least a portion of the resident data may be complementary with the first data in the initial dataset 404. More specifically, the initial dataset vector 426 as transmitted to the ML dataset vector comparison algorithm 428 is compared to the stored column vectors 450 though the second vector analysis operations 522 to establish relevancy and joinability of the respective stored data.

In some embodiments, the second comparison operations 524 include a second mini-loop of incrementing comparisons with some or all of the stored column vectors 450. In some embodiments, the previous training of the convolutional neural network may be sufficient to "remember" previous vector comparisons and may thereby eliminate at least a portion of the incrementing second mini-loop. In addition, in some embodiments, analyzing historical selections of the stored datasets as a function of the respective previous applications of the stored datasets to the respective machine learning models may also eliminate at least a portion of the incrementing second mini-loop operations.

In one or more embodiments, in a manner similar to that for the first vector analysis operations 514, each initial dataset-stored column vectors' comparison is scored and measured against a predetermined comparison threshold. In some embodiments, the comparison threshold is established by the builders 402. In some embodiments, the comparison threshold is established through previous training based on the previous initial dataset-second column vectors' comparison scoring. In at least some embodiments, if the comparison scoring exceeds the threshold, the respective stored dataset containing the candidate second column of data is identified as a second candidate dataset. In some embodiments, if the comparison scored is at least substantially equal to the threshold, the respective stored dataset is identified as a second candidate dataset. Therefore, the training of the convolutional neural network 424 with respect to the measure of similarity between datasets may use both column distributional information and the respective cell similarity information to facilitate at least some further personalization of the model building operations through the data used. Accordingly, the results of the second vector analysis operations 522, i.e., the scores of the initial dataset-stored column vectors' comparisons, at least partially determine the second candidate datasets and exclude other stored datasets from consideration as a function of the joinability of specific data with the initial dataset 404.

In at least some embodiments, under the parameters previously discussed, the process 300 includes the builders 402 consider and select 530 from the one or more automatically determined candidate datasets, one or more second datasets for joining with the initial dataset 404, i.e., execute a candidate selection process 530. Specifically, the one or more candidate datasets are presented 532 through a user interface 600.

Figure 6:
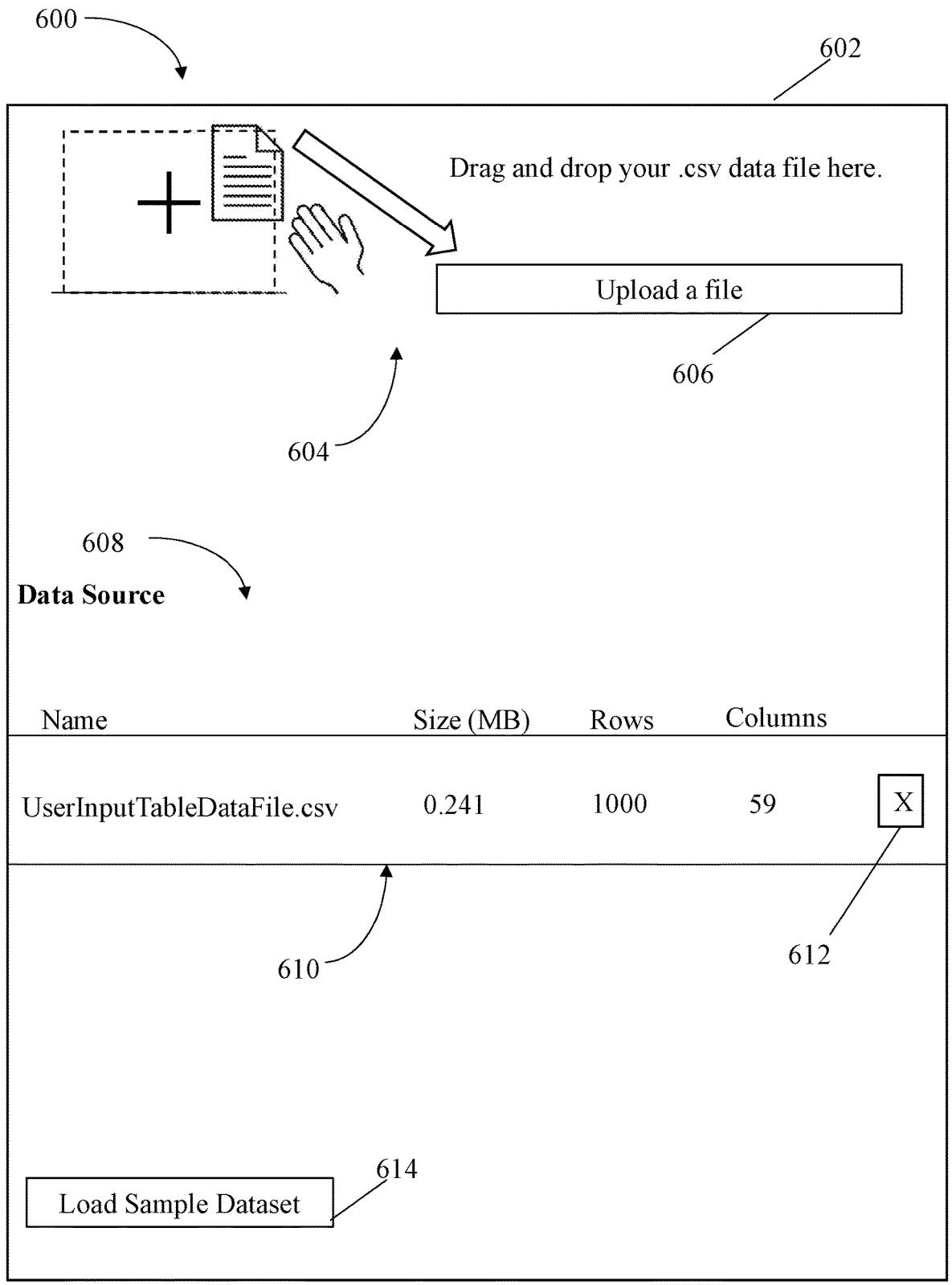
FIG. 6 is a schematic diagram illustrating a first portion of a user interface for selecting external datasets automatically discovered, in accordance with some embodiments of the present disclosure.
Figure 7:
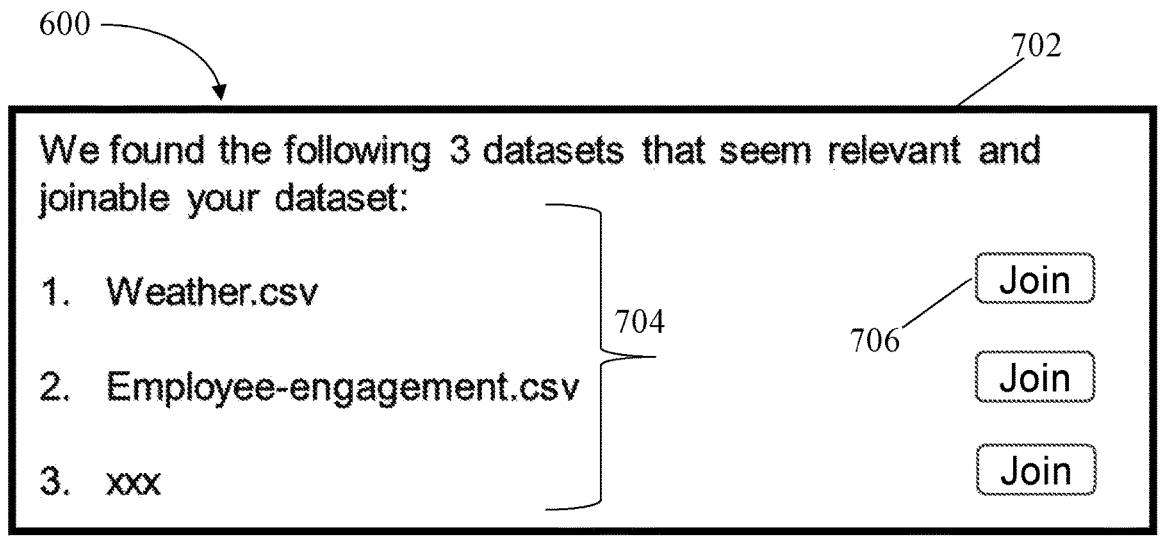
FIG. 7 is a schematic diagram illustrating a second portion of a user interface for selecting external datasets automatically discovered, in accordance with some embodiments of the present disclosure.
Figure 8:
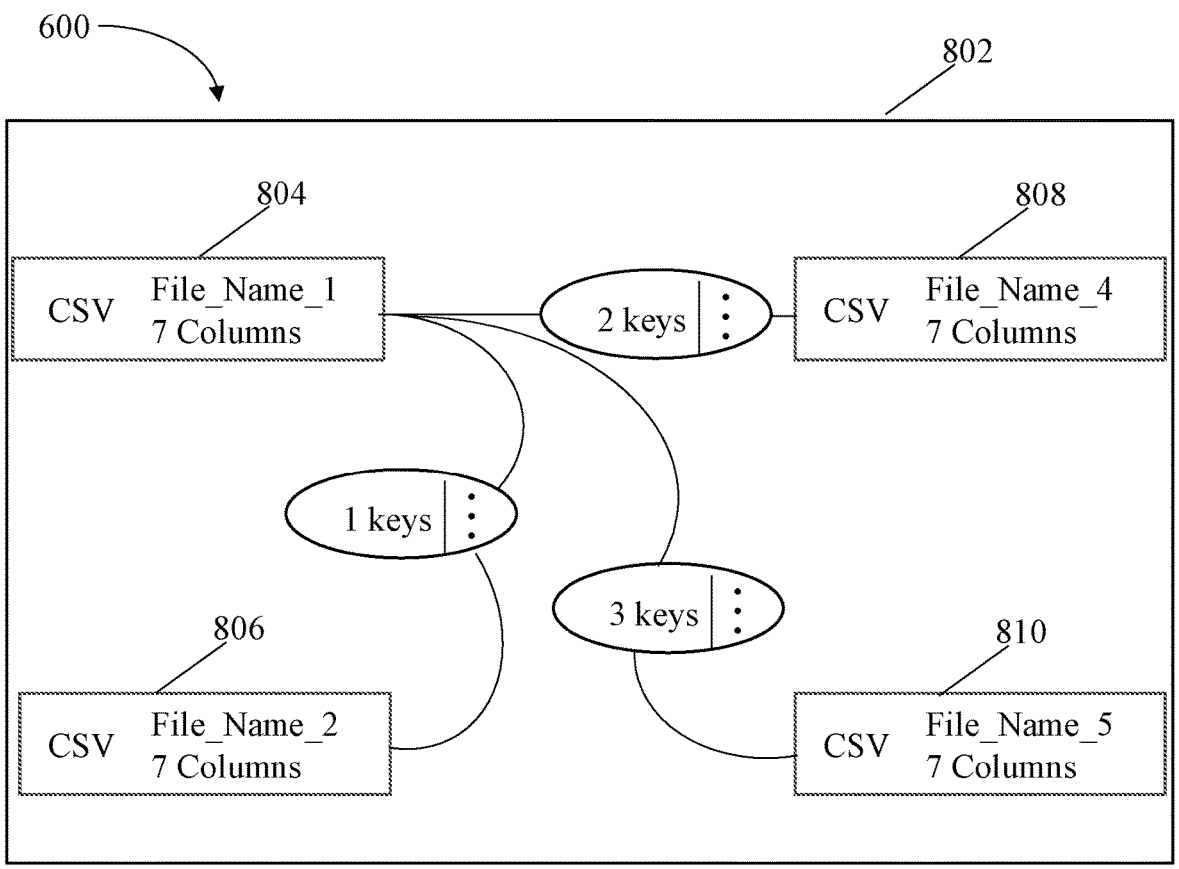
FIG. 8 is a schematic diagram illustrating a third portion of a user interface for selecting external datasets automatically discovered, in accordance with some embodiments of the present disclosure.

Referring to FIG. 6, a schematic diagram is provided illustrating a first portion 602 of the user interface 600 for selecting external datasets automatically discovered. Referring to FIG. 7, a schematic diagram is provided illustrating a second portion 702 of the user interface 600 for selecting external datasets automatically discovered. Referring to FIG. 8, a schematic diagram is provided illustrating a third portion 802 of the user interface 600 for selecting external datasets automatically discovered. In at least some embodiments, the builders 402 (shown in FIG. 4) access a user interface 600 to review the results of the first and second vector comparison operations, including a review of the first and second candidate datasets that appear to relevant and/or joinable to the initial dataset.

Also referring to FIGS. 4 and 5, at least a portion of the candidate selection process 530 includes the user interface 600 between the builders 402 and the auto data table discovery module 420 to determine the best automatically located stored dataset candidates for joining with the initial dataset 404 as a function of a weighting of each of the relevancy and joinability determinations resulting from the first and second vector analyses 514 and 522, respectively. In addition, at least a portion of the candidate selection process 530 includes determining if the data in each of the datasets (initial and candidates) is differentiable or not. As used herein, the term "differentiable" refers to a dataset that may be represented as a continuous function that is differentiable through the full range of the respective domain. This differentiable continuity facilitates training a neural network through forward and backward learning, and facilitates fully automated and optimized post-training analysis of differentiable data/problems within the respective domain. Typically, supervised learning operations are used to input the differentiable data into the respective neural network. in contrast, non-differentiable data due to discontinuities, i.e., gaps in the data used to train the neural network may require reinforcement learning operations to overcome the gaps.

The candidate selection process 530 further includes aspects of exercising aspects of "cooperative gaming solutions" to determine the best candidate datasets that include at least some additional data that may be used to complement the initial dataset 404. As used herein, developing a cooperative game solution includes determining, through a specialized algorithm resident within an auto data table joining algorithm 460 (resident within the auto data table discovery module 420 and discussed further herein), from the set of candidate datasets, which datasets provide both the best aspects of relevancy and joinability, where the two characteristics may include opposing features therebetween. For example, and without limitation, while the first vector analysis 514 may indicate a degree of relevancy between a particular stored dataset 440 and the initial dataset 404 that exceeds the established threshold, due to a degree of non-differentiable data, i.e., gaps in the respective data established in the second vector analysis 522, the respective individual cells of data is the respective one or more columns 442 may not reach the relevancy and joinability threshold. In contrast, while there may be a good degree of relevant and joinable data within the cells of the candidate dataset, the overall relevancy of the respective dataset may not reach the respective relevancy threshold. Therefore, the auto data table joining algorithm 460 embedded in the auto data table discovery module 420 will automatically determine the tradeoffs between the identified datasets to select the dataset that best complements the data in the initial dataset, and select those candidate datasets that will best provide the desired results in the model under construction.

Such selections are recorded within the auto data table discovery module 420 for additional training of the module for future stored dataset selection operations. Accordingly, the auto data table discovery module 420 determines the best tradeoff solutions for balancing the needs of the builders 402 with the data that is available, and provides those automatically determined "best" candidate datasets to the user interface 600.

Referring to FIGS. 4-6, the first portion 602 of the user interface 600 includes a drag and drop feature 604 that facilitates selecting the desired initial dataset 404. While the loading of the initial dataset 404 is performed as described with reference to the receive the initial dataset operation 502, the user interface portion 602 to execute that operations is provided here with the remained of the user interface 600. Once the desired file is selected, an "Upload a file" icon 606 is operated and a plurality of fields 610 in a "data source" portion 608 are populated. The data and fields 610 shown in FIG. 6 should not be considered limiting. A "remove file" icon 612 is provided to remove the selection. Once the desired file for the initial dataset 404 is selected, a "load sample dataset" icon 614 is operated to load the initial dataset 404 into the auto data table discovery module 420.

Referring to FIGS. 4-5 and 7, as previously described, the first vector analysis 514 determines those relevant stored datasets and the second vector analysis 522 determines those columns of the stored datasets with the relevant and joinable data. The respective candidate datasets are presented to the builders 402 through the second portion 702 of the user interface 600. Specifically, the second portion 702 includes a report 704 of those stored datasets 440 that are determined to be a candidate suitable for joining with the initial dataset 404 based on the analyses and parameters previously discussed. A join icon 706 is provided for each candidate dataset. In some embodiments, only one candidate dataset is selected. In some embodiments, any number of candidate datasets may be selected. The number of three candidate datasets is non-limiting.

Referring to FIGS. 4-5 and 8, the third portion 802 of the user interface 600 includes a set of candidate datasets pictorially presented for a visual representation to the builders 402. For example, as shown, the initial dataset 404 is shown as an icon 804 with the number of columns in the initial dataset 404 listed, in this case, 7 columns. The three candidate datasets are represented with icons, i.e., the first candidate dataset 806, the second candidate dataset 808, and the third candidate dataset 810, respectively. The number of three candidate datasets is non-limiting. As shown in FIG. 8, the first candidate dataset 806 includes one column of data that may be used to join with the initial dataset 804, such a joinable column hereinafter referred to as a key. Similarly, the second candidate dataset 808 and the third candidate dataset 810 include two and three keys, respectively. Accordingly, the candidate datasets with relevant and joinable columns are indicated through the user interface 600.

In some embodiments, those candidate datasets determined as relevant through the first vector analysis 514, but without relevant and joinable columns as indicated by the second vector analysis 522, are also indicated as having no respective joinable columns. This feature provides the builders 402 with the option for selecting the relevant candidate datasets without joinable data over the candidate datasets with the recommended columns of joinable data for the reasons previously discussed.

Referring again to FIG. 4, a first portion of the columns 442 in the candidate datasets, e.g., store dataset 440 may overlap with a portion of the columns 406 in the initial dataset 404, for example columns 446 and column 410, respectively. Also, a second portion of the columns 442 in the candidate datasets, e.g., stored dataset 440 will be determined by the auto data table joining algorithm 460 to be neither relevant nor joinable and will be ignored, e.g., the columns 462, 464, 466, and 468. Further, a third portion of the columns 442 in the candidate datasets, e.g. stored dataset 440 may be both relevant and joinable, e.g., the "Salary Increase" column 470. Accordingly, once one or more candidate datasets are selected by the builders 402 through the user interface 600 (shown on FIGS. 6-8), the model creation is initiated.

Referring again to FIGS. 1, 4, and 5, as discussed herein, the auto data table discovery module 420 automatically determines those candidate stored datasets that may be joined with the initial dataset 404. However, typically, not all of the candidate datasets may be both relevant and joinable. Therefore, the auto data discovery module 420 automatically determines 534 suggested one or more candidate second columns, e.g., column 470 for joining with the first dataset 404. Also, as previously discussed, once the builders 402 have reviewed the automatically determined candidate stored datasets, the builders 402 will join 536 at least a portion of the complementary resident data from the one or more candidate datasets with the first dataset 404, thereby generating a joined dataset 472 through the auto data table joining algorithm 460. Specifically, once the builders 402 have reviewed and selected 538 the automatically suggested joinable columns of data resident within the candidate datasets, the data from the selected candidate columns is joined 540 with the initial dataset 404 through the auto data table joining algorithm 460 to generate the joined dataset 472

As a portion of the joining operation 540, the auto data table joining algorithm 460 records the selections made by the builders 402 for training the convolution neural network 424 within the table embedding model 422. The joined dataset 472 is transmitted to the trainable autoAI manager 480 (the autoAI manager 156 of FIG. 1) that uses an auto AI model generator module 482 (the auto AI model generator module 158 in FIG. 1) to build, i.e., generate 542 the one or more autoAI generated models 490. The autoAI manager 480 is trainable through machine learning features embedded therein, where the received training is at least partially based on the selection of the data in the joined dataset used to build the respective models to improve future model building operations.

The system, computer program product, and method as disclosed herein significantly reduces the manual labor required to find all of the data necessary to generate machine learning models that will perform satisfactorily once placed into production. The disclosed system and methods herein use a trainable convolutional neural network to automatically locate candidate secondary datasets, including relevant and joinable data in particular columns, for joining with the builder-provided datasets. The features of the trainable convolutional neural network may be directed toward generating a personalized list of machine learning models for a particular user through the AutoAI described herein. For example, the AutoAI maintains a history of machine learning models selected by the user that may be accessed by the AutoAI to select one or more preferred machine learning models from the history of machine learning models historically selected. The external datasets accessed and automatically selected may be based on the historically selected datasets for the preferred machine learning models.

Therefore, the embodiments disclosed herein provide an improvement to computer technology through expediting the building of machine learning models through the associated automated features. Accordingly, the improvement to computer technology is manifested in a practical technical application of the methods described herein to train models to locate and suggest additional data to be used to build machine learning models automatically in lieu of known labor- and time-intensive and error-prone manual methodologies.

Figure 9:
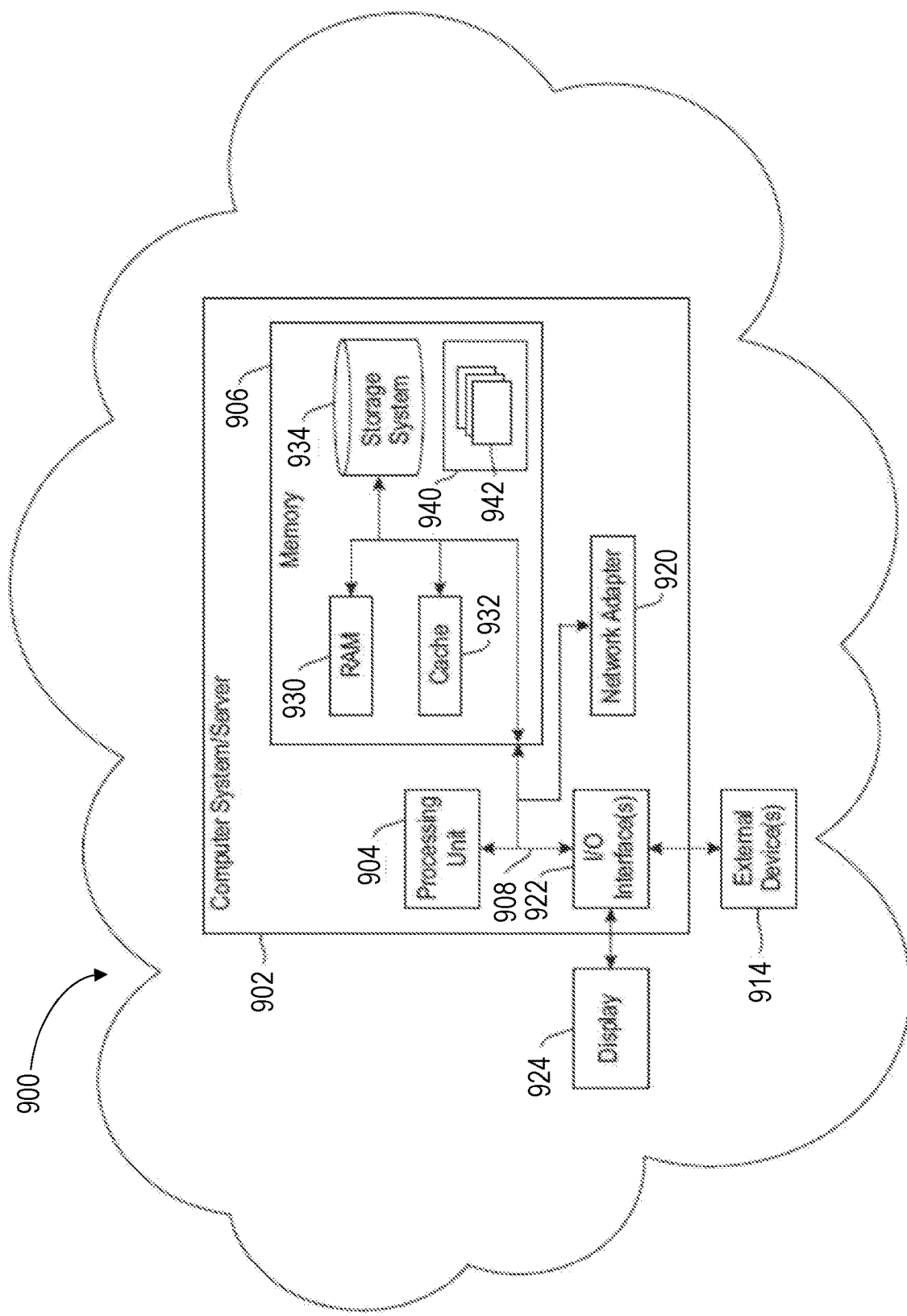
FIG. 9 is a block diagram illustrating a computer system/server of a cloud-based support system, to implement the processes described above with respect to FIGS. 1-8, in accordance with some embodiments of the present disclosure.

Aspects of the computer system 100 (FIG. 1), i.e., automated machine learning (ML) system 100 may be embodied in a computer system/server in a single location, or in at least one embodiment, may be configured in a cloud-based system sharing computing resources. With reference to FIG. 9, a block diagram is provided illustrating an example of a computer system 900 including a computer system/server 902, hereinafter referred to as a host 902 in communication with a cloud-based support system, to implement the system, tools, and processes described above with respect to FIGS. 1-8. Host 902 is operational with numerous other general purpose or special purpose computer system environments or configurations. Examples of well-known computer systems, environments, and/or configurations that may be suitable for use with host 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 902 may be described in the general context of computer system-executable instructions, such as program modules, being executed by a computer system. Generally, program modules may include routines, programs, objects, components, logic, data structures, and so on that perform particular tasks or implement particular abstract data types. Host 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, host 902 is shown in the form of a general-purpose computing device. The components of host 902 may include, but are not limited to, one or more processors or processing devices or units 904, e.g., hardware processors, a system memory 906, and a bus 908 that couples various system components including system memory 906 to processing device 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 902 typically includes a variety of computer system readable media. Such media may be any available media that is accessible by host 902 and it includes both volatile and non-volatile media, removable and non-removable media.

Memory 906 can include computer system readable media in the form of volatile memory, such as random access memory (RAM) 930 and/or cache memory 932. By way of example only, a storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces.

Program/utility 940, having a set (at least one) of program modules 942, may be stored in memory 906 by way of example, and not limitation, as well as an operating system, one or more application programs, other program modules, and program data. Each of the operating systems, one or more application programs, other program modules, and program data or some combination thereof, may include an implementation of a networking environment. Program modules 942 generally carry out the functions and/or methodologies of embodiments as described in FIGS. 1-8.

Host 902 may also communicate with one or more external devices 914, such as a keyboard, a pointing device, etc.; a display 924; one or more devices that enable a user to interact with host 902; and/or any devices (e.g., network card, modem, etc.) that enable host 902 to communicate with one or more other computing devices. Such communication can occur via Input/Output (I/O) interface(s) 922. Still yet, host 902 can communicate with one or more networks such as a local area network (LAN), a general wide area network (WAN), and/or a public network (e.g., the Internet) via network adapter 920. As depicted, network adapter 920 communicates with the other components of host 902 via bus 908. In at least one embodiment, a plurality of nodes of a distributed file system (not shown) is in communication with the host 902 via the I/O interface 922 or via the network adapter 920. It should be understood that although not shown, other hardware and/or software components could be used in conjunction with host 902. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 906, including RAM 930, cache memory 932, and storage system 934, such as a removable storage drive and a hard disk installed in a hard disk drive.

Computer programs (also called computer control logic) are stored in memory 906. Computer programs may also be received via a communication interface, such as network adapter 920. Such computer programs, when run, enable the computer system to perform the features of the present embodiments as discussed herein. In particular, the computer programs, when run, enable the processing device 904 to perform the features of the computer system 900. As such, computer programs may represent controllers of the computer system 900.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In at least one embodiment, host 902 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a state of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
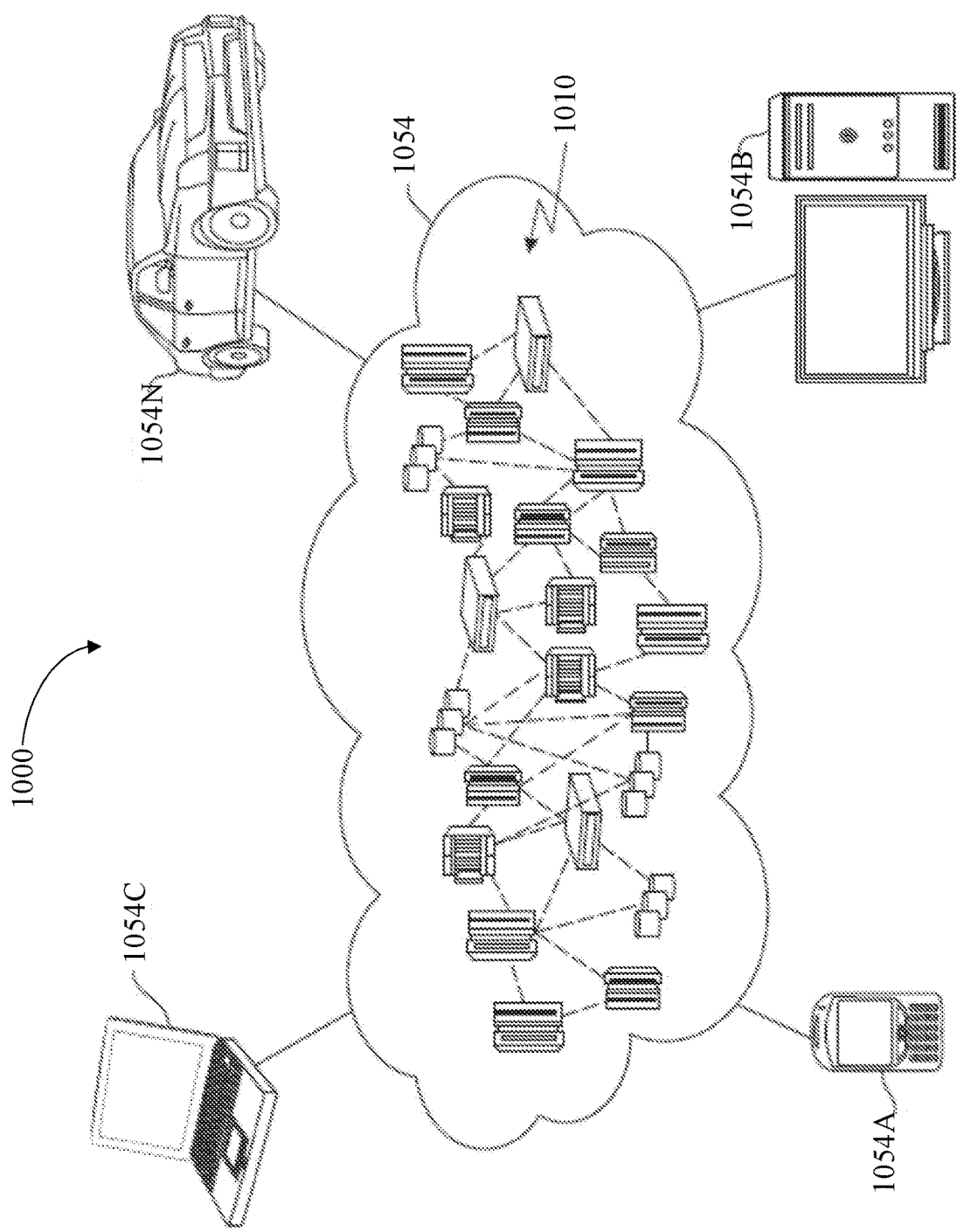
FIG. 10 is a schematic diagram illustrating a cloud computer environment, in accordance with some embodiments of the present disclosure.

Referring now to FIG. 10, a schematic diagram is provided illustrating an example cloud computing network 1000. As shown, cloud computing network 1000 includes a cloud computing environment 1054 having one or more cloud computing nodes 1010 with which local computing devices used by cloud consumers may communicate. Examples of these local computing devices include, but are not limited to, personal digital assistant (PDA) or cellular telephone 1054A, desktop computer 1054B, laptop computer 1054C, and/or automobile computer system 1054N. Individual nodes within nodes 1010 may further communicate with one another. They may be grouped (not shown) physically or virtually, in one or more networks, such as Private, Community, Public, or Hybrid clouds as described hereinabove, or a combination thereof. This allows the cloud computing network 1000 to offer infrastructure, platforms and/or software as services for which a cloud consumer does not need to maintain resources on a local computing device. It is understood that the types of computing devices 1054A-N shown in FIG. 10 are intended to be illustrative only and that the cloud computing environment 1054 can communicate with any type of computerized device over any type of network and/or network addressable connection (e.g., using a web browser).

Figure 11:
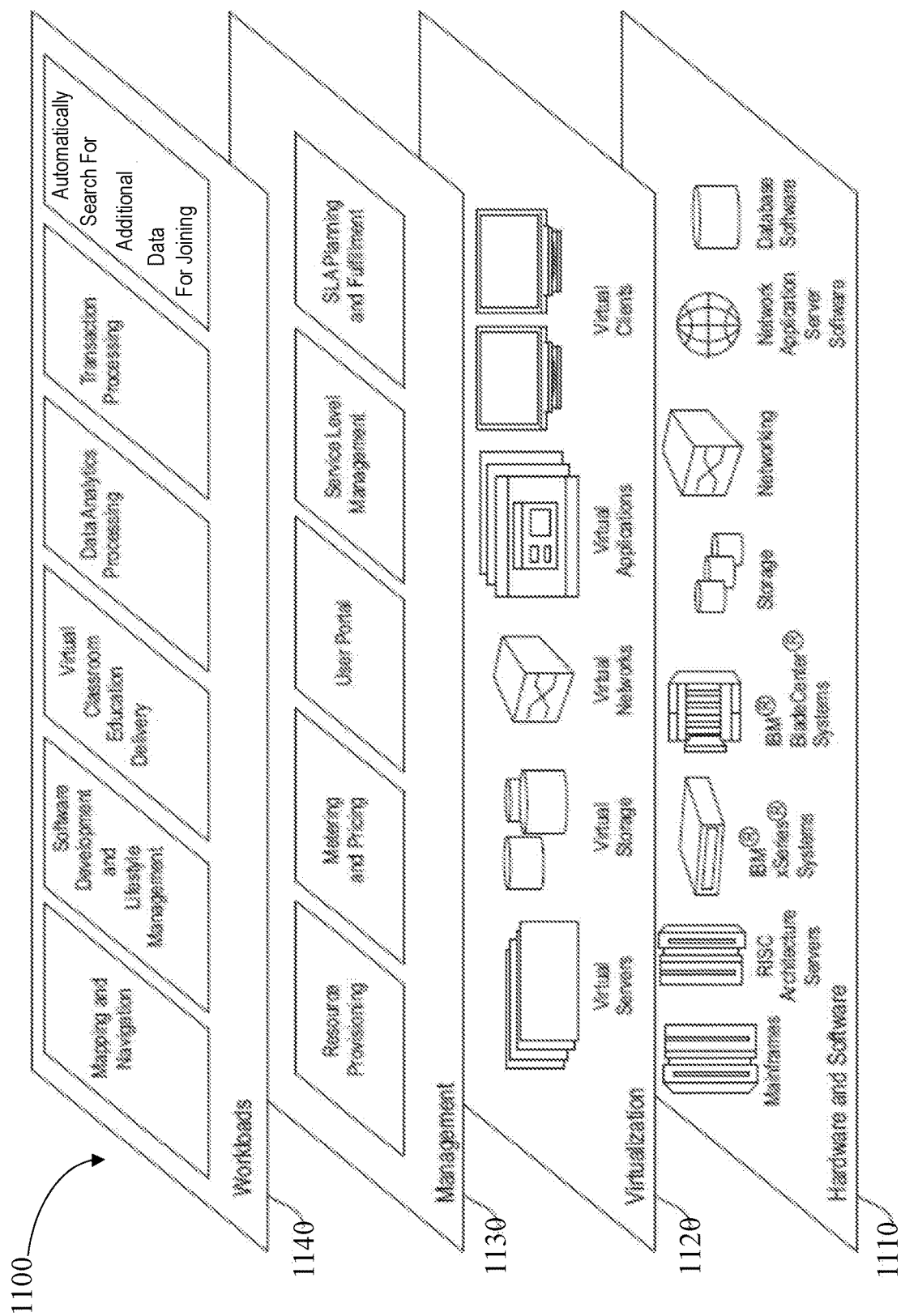
FIG. 11 is a block diagram illustrating a set of functional abstraction model layers provided by the cloud computing environment, in accordance with some embodiments of the present disclosure.

Referring now to FIG. 11, a set of functional abstraction layers 1100 provided by the cloud computing network of FIG. 11 is shown. It should be understood in advance that the components, layers, and functions shown in FIG. 10 are intended to be illustrative only, and the embodiments are not limited thereto. As depicted, the following layers and corresponding functions are provided: hardware and software layer 1110, virtualization layer 1120, management layer 1130, and workload layer 1140.

The hardware and software layer 1110 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 1120 provides an abstraction layer from which the following examples of virtual entities may be provided: virtual servers; virtual storage; virtual networks, including virtual private networks; virtual applications and operating systems; and virtual clients.

In one example, management layer 1130 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 1140 provides examples of functionality for which the cloud computing environment may be utilized. Examples of workloads and functions which may be provided from this layer include, but are not limited to: leveraging a trained cognitive system to automatically search for additional data in an external data source that may be joined with an initial user-selected data table to generate a more robust machine learning model.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   a server comprising at least one processing device and at least one memory device operably coupled to the at least one processing device; and
   a data repository in operable communication with the server, the server configured to:

receive a first dataset;
access, automatically, the data repository, wherein the data repository includes a plurality of stored datasets;
determine, automatically, from the plurality of stored datasets, one or more candidate datasets to further generate the one or more machine learning models, the one or more candidate datasets including resident data therein, at least a portion of the resident data complementary with the first dataset;
facilitate selection of, from the one or more candidate datasets, one or more second datasets;
join at least a portion of the complementary resident data from the one or more second datasets with the first dataset, thereby generating a joined dataset; and
generate, automatically, through the joined dataset, one or more machine learning models.

2. The system of claim 1, wherein the computer system is a cognitive system.

3. The system of claim 2, wherein the cognitive system is an artificial intelligence (AI) platform, the method further comprising:
the AI platform resident within the server, the AI platform in operable communication with the data repository, the AI platform comprising:
a data manager comprising an autoAI table discovery module configured to facilitate execution of one or more operations by the server comprising the automatic determination of the one or more candidate datasets comprising:
execute a first vector analysis, comprising:
convert the first dataset into a first dataset vector;
convert each stored dataset of the plurality of stored datasets into a respective stored dataset vector;
compare the first dataset vector with each stored dataset vector, thereby generate one or more dataset vectors' comparisons;
score each dataset vectors' comparison; and
determine, subject to the one or more dataset vectors' comparisons, the respective score of the one or more dataset vectors' comparisons exceeds a predetermined first threshold, wherein the predetermined first threshold is at least partially established through training one or more machine learning dataset vector comparison algorithms.

4. The system of claim 3, further comprising one or more user interfaces, wherein the autoAI table discovery module is further configured to facilitate the execution of one or more operations by the server comprising the selection of the one or more second datasets comprising:
present, via the one or more user interfaces, the one or more candidate datasets; and
facilitate the selection of, from the one or more candidate datasets, the one or more second datasets.

5. The system of claim 4, wherein the autoAI table discovery module is further configured to facilitate the execution of one or more operations by the server comprising the training of the one or more machine learning dataset vector comparison algorithms comprising:
analysis of historical selections of the one or more second datasets as a function of application of the one or more second datasets to respective machine learning models.

6. The system of claim 3, wherein:
the first dataset is configured into a tabular arrangement including a plurality of first columns and first rows of first data; and each second dataset of the one or more second datasets is configured into a tabular arrangement including a plurality of second columns and second rows of second data.

7. The system of claim 6, wherein the autoAI table discovery module is further configured to facilitate the execution of one or more operations by the server comprising:
execute a second vector analysis, comprising:
convert each second column of the plurality of second columns into a respective second column vector;
compare the first dataset vector with each respective second column vector, thereby generating one or more first dataset-second column vectors' comparisons;
score each first dataset-second column vectors' comparison;
determine, subject to the first dataset-second column vectors' comparisons, the respective score of each first dataset-second column vectors' comparison exceeds a predetermined second threshold, wherein the predetermined second threshold is at least partially established through training the one or more machine learning dataset vector comparison algorithms;
determine, automatically, one or more suggested second columns for joining with the first dataset;
select, from the one or more suggested second columns, one or more second columns for joining with the first dataset; and
join the selected one or more second columns with the first dataset.

8. A computer program product, comprising:
one or more computer readable storage media; and
program instructions collectively stored on the one or more computer storage media, the program instructions comprising:
program instructions to receive a first dataset;
program instructions to access, automatically, the data repository, wherein the data repository includes a plurality of stored datasets;
program instructions to determine, automatically, from the plurality of stored datasets, one or more candidate datasets to further generate the one or more machine learning models, the one or more candidate datasets including resident data therein, at least a portion of the resident data complementary with the first dataset;
program instructions to facilitate selection of, from the one or more candidate datasets, one or more second datasets;
program instructions to join at least a portion of the complementary resident data from the one or more second datasets with the first dataset, thereby generating a joined dataset; and
program instructions to generate, automatically, through the joined dataset, one or more machine learning models.

9. The computer program product of claim 8, further comprising:
program instructions to execute a first vector analysis, comprising:
program instructions to convert the first dataset into a first dataset vector;
program instructions to convert each stored dataset of the plurality of stored datasets into a respective stored dataset vector;

program instructions to compare the first dataset vector with each stored dataset vector, thereby generate one or more dataset vectors' comparisons;

program instructions to score each dataset vectors' comparison; and program instructions to determine, subject to the one or more dataset vectors' comparisons, the respective score of the one or more dataset vectors' comparisons exceeds a predetermined first threshold, wherein the predetermined first threshold is at least partially established through training one or more machine learning dataset vector comparison algorithms.

10. The computer program product of claim 9, further comprising:

program instructions to present, via the one or more user interfaces, the one or more candidate datasets.

11. The computer program product of claim 10, further comprising:

program instructions to analyze historical selections of the one or more second datasets as a function of application of the one or more second datasets to respective machine learning models.

12. The computer program product of claim 9, further comprising:

program instructions to configure the first dataset into a tabular arrangement including a plurality of first columns and first rows of first data; and program instructions to configure each second dataset of the one or more second datasets into a tabular arrangement including a plurality of second columns and second rows of second data.

13. The computer program product of claim 12, further comprising:

program instructions to execute a second vector analysis, comprising:

program instructions to convert each second column of the plurality of second columns into a respective second column vector;

program instructions to compare the first dataset vector with each respective second column vector, thereby generating one or more first dataset-second column vectors' comparisons;

program instructions to score each first dataset-second column vectors' comparison;

program instructions to determine, automatically, one or more suggested second columns for joining with the first dataset;

program instructions to select, from the one or more suggested second columns, one or more second columns for joining with the first dataset; and program instructions to join the selected one or more second columns with the first dataset.

14. The computer program product of claim 13, wherein the program instructions to execute the second vector analysis further comprise:

program instructions to determine, subject to the first dataset-second column vectors' comparisons, the respective score of each first dataset-second column vectors' comparison exceeds a predetermined threshold, wherein the predetermined threshold is at least partially established through training the one or more machine learning dataset vector comparison algorithms.

15. A computer-implemented method comprising:

receiving a first dataset;

accessing, automatically, a data repository, wherein the data repository includes a plurality of stored datasets;

determining, automatically, from the plurality of stored datasets, one or more candidate datasets to further generate the one or more machine learning models, the one or more candidate datasets including resident data therein, at least a portion of the resident data complementary with the first dataset;

selecting, from the one or more candidate datasets, one or more second datasets;

joining at least a portion of the complementary resident data from the one or more second datasets with the first dataset, thereby generating a joined dataset; and generating, automatically, through the joined dataset, one or more machine learning models.

16. The method of claim 15, wherein determining, automatically, the one or more candidate datasets comprises:

executing a first vector analysis, comprising:

converting the first dataset into a first dataset vector;

converting each stored dataset of the plurality of stored datasets into a respective stored dataset vector;

comparing the first dataset vector with each stored dataset vector, thereby generating one or more dataset vectors' comparisons;

scoring each dataset vectors' comparison; and determining, subject to the one or more dataset vectors' comparisons, the respective score of one or more dataset vectors' comparisons exceeds a predetermined first threshold, wherein the predetermined first threshold is at least partially established through training one or more machine learning dataset vector comparison algorithms.

17. The method of claim 16, wherein selecting the one or more second datasets comprises:

presenting, via a user interface, the one or more candidate datasets.

18. The method of claim 17, wherein training one or more machine learning dataset vector comparison algorithms comprises:

analyzing historical selections of the one or more second datasets as a function of application of the one or more second datasets to respective machine learning models.

19. The method of claim 16, wherein determining, automatically, one or more candidate datasets further comprises:

configuring the first dataset into a tabular arrangement including a plurality of first columns and first rows of first data; and configuring each second dataset of the one or more second datasets into a tabular arrangement including a plurality of second columns and second rows of second data.

20. The method of claim 19, wherein determining, automatically, suggested one or more second columns for joining with the first dataset comprises:

executing a second vector analysis, comprising:

converting each second column of the plurality of second columns into a respective second column vector;

comparing the first dataset vector with each respective second column vector, thereby generating one or more first dataset-second column vectors' comparisons;

scoring each first dataset-second column vectors' comparison;

determining, subject to the first dataset-second column vectors' comparisons, the respective score of each first dataset-second column vectors' comparison exceeds a predetermined second threshold, wherein the predetermined second threshold is at least partially established through training the one or more machine learning dataset vector comparison algorithms;

determining, automatically, subject to the scoring, one or more suggested second columns for joining with the first dataset;

selecting, from the one or more suggested second columns, one or more second columns for joining with the first dataset; and joining the selected one or more second columns with the first dataset.

* * * * *